United States Patent
Ström et al.

(10) Patent No.: US 9,918,095 B1
(45) Date of Patent: Mar. 13, 2018

(54) PIXEL PROCESSING AND ENCODING

(71) Applicant: Telefonaktiebolaget LM Ericsson (publ), Stockholm (SE)

(72) Inventors: Jacob Ström, Stockholm (SE); Kenneth Andersson, Gävle (SE); Olie Baumann, Southampton (GB); Martin Pettersson, Vallentuna (SE); Jonatan Samuelsson, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/503,301

(22) PCT Filed: May 12, 2016

(86) PCT No.: PCT/SE2016/050432
§ 371 (c)(1),
(2) Date: Feb. 10, 2017

(87) PCT Pub. No.: WO2016/186551
PCT Pub. Date: Nov. 24, 2016

Related U.S. Application Data

(60) Provisional application No. 62/164,160, filed on May 20, 2015.

(51) Int. Cl.
*H04N 7/12* (2006.01)
*H04N 19/182* (2014.01)
(Continued)

(52) U.S. Cl.
CPC ......... *H04N 19/182* (2014.11); *H04N 19/186* (2014.11); *H04N 19/86* (2014.11)

(58) Field of Classification Search
CPC .. H04N 19/154; H04N 19/102; H04N 19/134; H04N 19/182; H04N 19/189; H04N 19/85; H04N 19/86
(Continued)

(56) References Cited

U.S. PATENT DOCUMENTS

| | | |
|---|---|---|
| 2009/0123089 A1 | 5/2009 | Karlov et al. |
| 2014/0078198 A1 | 3/2014 | Roh et al. |
| 2017/0188000 A1* | 6/2017 | Rosewarne ............... H04N 9/77 |

FOREIGN PATENT DOCUMENTS

WO   2013/142067 A1   9/2013

OTHER PUBLICATIONS

International Search Report and Written Opinion issued in corresponding International application No. PCT/SE2016/050432, dated Oct. 7, 2016, 11 pages.

(Continued)

*Primary Examiner* — Francis G Geroleo
(74) *Attorney, Agent, or Firm* — Rothwell, Figg, Ernst & Manbeck, p.c.

(57) ABSTRACT

A method of processing pixels in a picture of a video sequence comprising multiple pictures comprises identifying a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The method also comprises processing the identified pixel by modifying a value of at least one color component of the pixel. The method achieves a selective denoising of particular color components in certain situations to reduce the encoding cost yet do not significantly affect the visual quality.

20 Claims, 15 Drawing Sheets

(51) Int. Cl.
  *H04N 19/186* (2014.01)
  *H04N 19/86* (2014.01)
(58) Field of Classification Search
  USPC .................................................... 375/240.12
  See application file for complete search history.

(56) References Cited

OTHER PUBLICATIONS

Chou., C.-H. and K.-C Liu., "Colour image compression based on the measure of just noticeable colour difference," IET Image Process, vol. 2, No. 6, 2008, pp. 304-322.

Ström, Jacob (Ericsson), "Investigation of HDR Color Subsampling," ISO/IEC JTC1/SC29/WG11 MPEG2014/M35841, Feb. 2015, Geneva, Switzerland, 25 pages.

Luthra, Ajay et al., "Test sequences and anchor generation for HDR and Wide Gamut Content Distribution," International Organisation for Standardisation, ISO/IEC JTC1/SC29/WG11 Coding of Moving Pictures and Audio, ISO/IEC JTC1/SC29/WG11 MPEG2014/N14548, Jul. 2014, Sapporo, Japan, 14 pages.

Luthra, Ajay et al., "Call for Evidence (CfE) for HDR and WCG Video Coding," International Organisation for Standardisation, ISO/IEC JTC1/SC29/WG11,Coding of Moving Pictures and Audio, ISO/IEC JTC1/SC29/WG11 MPEG2014/N15083, Feb. 2015, Geneva, Switzerland, 74 pages.

\* cited by examiner

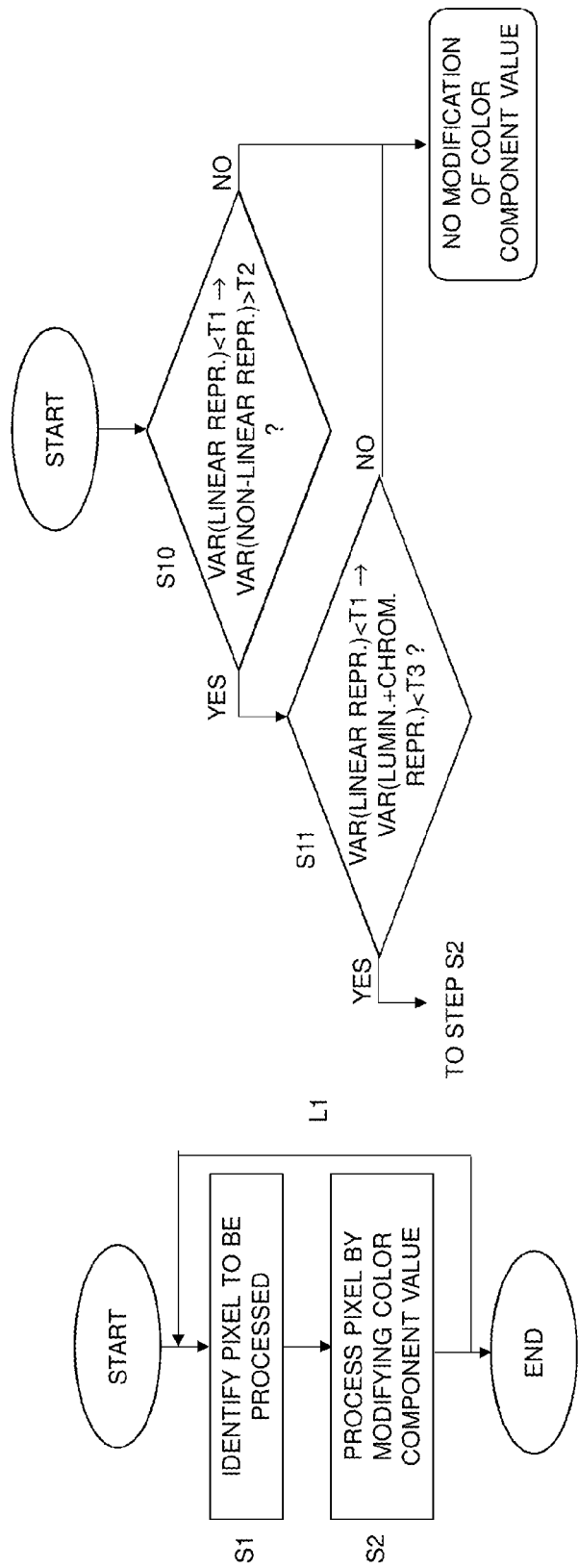

PIXEL PROCESSING AND ENCODING

CROSS REFERENCE TO RELATED APPLICATION(S)

This application is a 35 U.S.C. § 371 National Stage of International Patent Application No. PCT/SE2016/050432, filed May 12, 2016, designating the United States and claiming priority to U.S. provisional application No. 62/164,160, filed on May 20, 2015. The above identified applications are incorporated by reference.

TECHNICAL FIELD

The present embodiments generally relate to processing and encoding of pixels in a picture, and in particular to such processing and encoding that improves encoding efficiency without significant deterioration of perceived quality.

BACKGROUND

A combination of a highly non-linear transfer function, 4:2:0 or 4:2:2 subsampling and non-constant luminance ordering gives rise to severe artifacts in saturated colors, i.e. color values close to the edge of the color gamut. An example is described in Annex B, where changes between two colors of similar luminance can result in a reconstructed image or picture with very different luminances.

One way to get around the problem is to not use luma values Y' and chroma value Cb' and Cr' for encoding, but instead some other color representation. However, there are indications that color representations other than Y'Cb'Cr' do not compress well. As an example, MPEG (Motion Picture Experts Group) tried YdZdX but the compression efficiency was not competitive against Y'Cb'Cr'.

Furthermore, many systems already use Y'Cb'Cr' or R'G'B' for the last step of the signal to the display. As an example, the HDMI (High Definition Multimedia Interface) standard has recently adopted the use of Y'Cb'Cr' 4:2:0 using ST 2084 for transmission of images from the set-top box to the TV as specified in CEA-861.3 [4]. This means that even if the encoding is done in some other color representation, after decoding it still needs to be converted to Y'Cb'Cr' 4:2:0, which will give rise to artifacts. Doing this conversion correctly can be quite complex when compared to the rest of the decoding chain, whereas doing the same thing in the encoder is not so expensive, relatively speaking; encoding is already so much more complex than decoding. It is therefore better to do a high-quality conversion to Y'Cb'Cr' already in the encoder. Due to these reasons it is advantageous to be able to use the Y'Cb'Cr' representation for encoding of HDR (High Dynamic Range) data.

Yet another way to cope with the problem is to simply make sure that the edges of the color gamut are never used. This will however severely limit the kind of colors that can be reproduced, so this is not a good solution.

Another solution to the problem is to use a transfer function with lower steepness, i.e. less non-linear, such as BT.1886. However, the problem with this approach is that many more bits would be required for representing each color component of a pixel in order to avoid banding artifacts. Alternatively one could use the same number of bits but limit the peak brightness.

There is therefore a need for an efficient processing of pixels in a picture of a video sequence that overcomes at least some of the problems mentioned above and that does not have the shortcomings of the above mentioned solutions.

SUMMARY

It is a general objective to provide an improved processing of pixels in a picture of a video sequence.

An aspect of the embodiments relates to a method of processing pixels in a picture of a video sequence comprising multiple pictures. The method comprises identifying a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The method also comprises processing the identified pixel by modifying a value of at least one color component of the pixel.

Another aspect of the embodiments relates to a device for processing pixels in a picture of a video sequence comprising multiple pictures. The device is configured to identify a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The device is also configured to process the identified pixel by modifying a value of at least one color component of the pixel.

A further aspect of the embodiments relates to a device for processing a pixel in a picture of a video sequence comprising multiple pictures. The device comprises a determining unit for identifying a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The device also comprises a pixel processor for processing the identified pixel by modifying a value of at least one color component of the pixel.

Yet another aspect of the embodiments relates to a device for encoding a pixel in a picture of a video sequence comprising multiple pictures. The device comprises a determining unit for identifying a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The device also comprises a pixel processor for processing the identified pixel by modifying a value of at least one color component in the linear representation of the color. The device further comprises a converter for converting the linear representation of the color into a non-linear representation of the color of the pixel. The device additionally comprises an encoder for encoding the non-linear representation of the color.

A further aspect of the embodiments relates to a device for encoding a pixel in a picture of a video sequence comprising multiple pictures. The device comprises a processor and a memory comprising instructions executable by the processor. The processor is operative to identify a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The processor is also operative to process the identified pixel by modifying a value of at least one color component in the linear representation of the color. The processor is further operative to convert the linear representation of the color into a non-linear representation of the color of the pixel. The processor is additionally operative to encode the non-linear representation of the color.

An additional aspect of the embodiments relates to a computer program comprising instructions, which when executed by a processor, cause the processor to identify a pixel to be processed in a picture of a video sequence comprising multiple pictures for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The processor is also caused to process the identified pixel by modifying a value of at least one color component of the pixel.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a signal representing an encoded version of a pixel in a picture of a video sequence comprising multiple pictures. The encoded version comprises an encoded non-linear representation of a color of the pixel according to any of the embodiments.

The processing of the embodiments achieves a selected denoising of color components for pixels having colors meeting defined criteria. The denoising results in a color representation of the pixel that is cheaper to encode yet not visibly different from the original pixel, i.e. without any denoising, for the naked eye.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of processing pixels in a picture according to an embodiment;

FIG. 2 is a flow chart illustrating an embodiment of the identifying step in FIG. 1;

DETAILED DESCRIPTION

Figure 4:
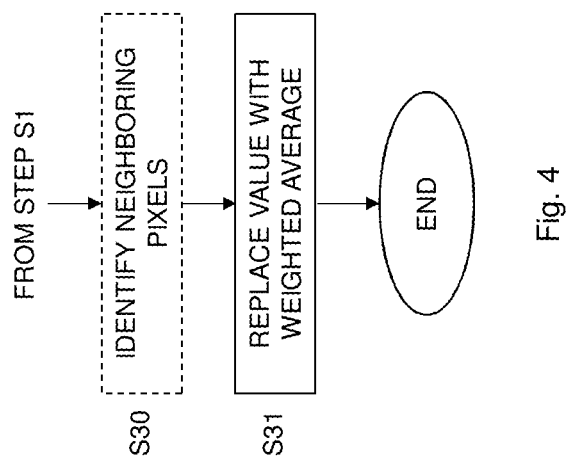
FIG. 4 is a flow chart illustrating an embodiment of the processing step in FIG. 1.

Throughout the drawings, the same reference numbers are used for similar or corresponding elements.

The present embodiments generally relate to processing and encoding of pixels in a picture, and in particular to such processing and encoding that improves encoding efficiency without significant deterioration of perceived quality.

A traditional encoding chain involves feeding pixels of incoming linear RGB light, typically ranging from 0 to 10,000 cd/m$^2$, to an inverse transfer function, which results in new pixel values between 0 and 1. After this, the pixels undergo color transformation resulting in a luma component Y' and two chroma components Cb', Cr'. Then, the two chroma components are subsampled, such as to 4:2:0 or 4:2:2. After decoding, the 4:2:0 or 4:2:2 sequences are upsampled to 4:4:4, inverse color transformed and finally a transfer function gives back pixels of linear light that can be output on a monitor.

A color space or color domain is the type and number of colors that originate from the combinations of color components of a color model. A color model is an abstract configuration describing the way colors can be represented as tuples of numbers, i.e. color components. The color components have several distinguishing features such as the component type, e.g. hue, and its unit, e.g. degrees or percentage, or the type of scale, e.g. linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (YCbCr, sometimes denoted Y'CbCr, Y'Cb'Cr', $YC_BC_R$, $Y'C_BC_R$ or $Y'C_B'C_R'$) color space and the luminance and chrominances (XYZ) color space.

In this document, the following terminology will be used.

RGB: Linear RGB values, where each value is proportional to the cd/m$^2$ ("number of photons").

XYZ: Linear XYZ values, where each value is a linear combination of RGB. Y is called luminance and loosely speaking reflects well what the eye perceives as "brightness" and XZ contains chrominance. XYZ is sometimes referred to as the CIE 1931 color space.

PQ(Y): A non-linear representation where the non-linear function PQ(.) has been applied to the linear luminance Y. An example of a non-linear function is the Perceptual Quantizer (PQ), the inverse of which is defined in equation A1. PQ(Y) is not to be confused with Y'. Since PQ(.) is based on Barten's curve, a small step in PQ(Y) is equivalent to a small step in perceived luminance.

R'G'B': Non-linear RGB values. R'=PQ(R), G'=PQ(G), B'=PQ(B).

Y'Cb'Cr': A non-linear representation where each value is a linear combination of R', G' and B'. Y' is called "luma", and Cb' and Cr' are collectively called "chroma". This is to distinguish Y' from luminance, since Y' also contains some chrominance, and Cb' and Cr' also contain some luminance.

ICtCp: A representation of color designed for High Dynamic Range (HDR) and Wide Color Gamut (WCG) imagery and is intended as an alternative to Y'Cb'Cr'. I represents intensity and is representation of luma information, whereas CtCp carries chroma information.

xy: A non-linear representation of chrominance derived from XYZ. It is non-linear since it has been normalized for "brightness" through x=X/(X+Y+Z), y=Y/(X+Y+Z). A monochromatic laser will always have the same coordinates in xy no matter what intensity it has. This means that xy is a good measure of chrominance.

u'v': A non-linear representation of chrominance, i.e. is a non-linear function of xy. It is supposed to be more perceptually uniform, meaning that a small step in u'v' will be equally perceptible regardless of which chrominance we are at. Just as for xy, a monochromatic laser will always have the same u'v' coordinates no matter what intensity it has.

PQ(Y)xy and PQ(Y)u'v': Representations of color where PQ(Y) contains all the luminance and xy or u'v' all the chrominance. From PQ(Y) it is possible to extract Y, and from Y, x, and y or Y, u' and v' it is possible to extract XYZ which can be transformed to RGB.

Log Luv: Uses the logarithm of the luminance Y and the (u', v') chromaticity coordinates (without logarithm) in order to provide a perceptually uniform color space.

The present embodiments propose a technology to avoid too much variation in a non-linear representation of the color of a pixels, such as in Cb' and Cr', as an alternative to or in combination with changing the luma values Y' to correct the luminance. In most cases, variation of Cb' and Cr' is desired, since it reflects the visible signal that is encoded. In some circumstances though, the variation in Cb' and Cr' does not reflect changes that are visually noticeable. In those cases it is possible to remove the variation, giving both a Cb'Cr' signal that is cheaper to code, since less variation means less bits during the encoding process, and is impossible to tell from the real signal and gives rise to a Y' that also is cheaper to code.

The reason why this is possible is the highly non-linear dependency between the signal space chosen to represent the content, such as Y'Cb'Cr' or ICtCp, and the signal space that the human visual system can perceive, such as linear luminance Y, possibly after a Barten's-like transfer function, PQ(Y), and fixed chrominance, xy, or, alternatively, u'v'. Simply put we can say that we represent the data as Y'Cb'Cr' or ICtCp but see the data as, for instance, PQ(Y)u'v'.

The hallmark of a non-linear function is that small variations in input can create large variations in output and vice versa. This is certainly the case here. In some cases very small variations in the variables that the human visual system can see, such as PQ(Y)u'v', give rise to large variations in the signals used for representation, Y'Cb'Cr'. By removing a small variation in PQ(Y)u'v' in these cases, it is possible to get a signal representation Y'Cb'Cr' that does not vary wildly, and which is therefore cheaper to code in terms of number of bits required to represent the encoded signal representation. Naturally, removing the small invisible variation will have no impact on visual quality, which means that the cheaper bit cost is not associated with a visual penalty.

As an example, if one of the color channels or components is much lower than the two other, it is possible to filter that channel so that the variation in that channel is lowered. Assume we have an area where some pixels have the linear color (R, G, B)=(1000, 0.1, 100), and other pixels have (R, G, B)=(1000, 0.2, 100). One can then apply a strong averaging filter on the green (G) component so that all pixels instead get the value (R, G, B)=(1000, 0.15, 100). The human visual system will not be able to tell the difference between the original picture and the processed picture with the filtered green components, but the processed picture will be much cheaper to code.

As will be described later, the pixels where it is preferred to lower the variation, i.e. denoise, are often situated along the edge of the color gamut.

An advantage is that by denoising a particular color component in certain situations, it is possible to get a representation that is much cheaper to encode yet impossible to tell from the original, i.e. without any denoising, by the naked eye.

Accordingly, the embodiments treat the original signal in a manner so that the differences between pixel colors in a first case, when the differences are not visible or hard to see, are removed, whereas the color differences in a second case, when the differences are visible, are kept. By doing so, the Y'Cb'Cr' representation of the pixel colors will be varying less or not at all, needing fewer bits or no bits to code, in the first case, where the variation is not visible or hard to see, whereas it will be varying in the second case, where the variation is actually visible.

Ideally the differences should not be visible in either luminance or chrominance. Only then is it safe to change the data without a risk for any visual artifacts. However, a change in luminance is typically worse than a change in chrominance, so in some cases the difference should at least not be visible in luminance.

The differences in the first case are removed by reducing the variability of components close to 0 when at least one of the other components is far from zero, to avoid variability in Y'Cb'Cr' that cannot be seen anyway, and which can create problems during the encoding.

FIG. 1 is a flow chart illustrating a method of processing pixels in a picture of a video sequence comprising multiple pictures. The method comprises identifying, in step S1, a pixel to be processed in the picture. The pixel identified in step S1 as a pixel to be processed in step S2 is a pixel meeting two criteria. Firstly, a variation in a linear representation of a color of the pixel that is smaller than a first threshold value results in a variation in a non-linear representation of the color that is larger than a second threshold value. Secondly, the variation in the linear representation of the pixel results in a variation in a luminance and chrominance based representation of the color that is smaller than a third threshold value. If a pixel is identified in step S1 to be processed, the method continues to step S2. This step S2 comprises processing the identified pixel by modifying a value of at least one of color component of the pixel.

Step S1 thereby involves identifying those pixels within a picture in which a small change or variation in the linear representation of its color, i.e. smaller than the first threshold value, results in a comparatively large change or variation in the non-linear representation of the color, i.e. larger than the second threshold value, but the change or variation in the linear representation of the color does not negatively affect the visual quality, i.e. should preferably not be possible to see by the human visual system as assessed by a resulting change or variation in the luminance and chrominance based representation of the color that is smaller than the third threshold value.

The pixels identified in step S1 are, thus, pixels having linear color representations that can be varied in a way that is hard to see for the human eye yet can create variations in the non-linear representation that are significant. Such pixels are then candidates to be processed in step S2 in a way that removes or at least reduces such variability and thereby implies that the pixels can be encoded with fewer bits as compared to if the identified pixels are not processed in step S2.

The linear representation of the color of the pixel is preferably an RGB representation of the color, i.e. a representation comprising a red (R) color component value, a green (G) color component value and a blue (B) color component value. In another embodiment, the linear representation of the color is an XYZ representation of the color.

The non-linear representation of the color of the pixel is preferably an Y'Cb'Cr' representation of the color, i.e. a representation comprising a luma (Y') component value and two chroma (Cb', Cr') component values. In an alternative embodiment, the non-linear representation of the pixel is an ICtCp representation of the color, in which the I component carries luma information and the CtCp components carry chroma information.

The luminance and chrominance based representation is preferably either a luminance+chrominance representation of the color or a representation that is based on, such as function(s) of the luminance and/or the chrominance. In an embodiment, the luminance and chrominance based representation is a PQ(Y)xy representation of the color, i.e. a representation comprising a non-linear function, preferably the transfer function PQ(.), of the luminance value (PQ(Y)) and linear representations of the chrominance (xy). In another embodiment, the luminance and chrominance based representation is PQ(Y)u'v', i.e. a representation comprising a non-linear function, preferably the transfer function PQ(.), of the luminance value (PQ(Y)), and a non-linear function, preferably the transfer function PQ(.), of the chrominance (u'v').

The luminance and chrominance based representation could be regarded as a perceptual representation since it is a color space that the human visual system can perceive.

FIG. 2 illustrates the identification step S1 in some more detail. The method starts in step S10, which investigates whether a variation in the linear representation of the color of the pixel that is smaller than the first threshold value (T1) results in a variation in the non-linear representation of the color that is larger than the second threshold value (T2). If not, the method ends and no modification of at least one color component value of the pixel is performed. If yes, the method continues to step S11, which comprises investigating whether the variation in the linear representation that was smaller than the first threshold value results in a variation in a luminance and chrominance based representation of the color that is smaller than the third threshold value (T3). If not, the method ends and no modification of at least one color component value of the pixel is performed. If yes, the method continues to step S2 in FIG. 1. The order of steps S10 and S11 may be interchanged, i.e. performing the investigation in step S11 prior to step S10, or indeed performing the investigations at least partly in parallel.

Generally, the third threshold value is zero or at least close to zero, such as 0.1 or 1. The second threshold could be around 100 as an illustrative example. Non-limiting but illustrative examples of the first threshold value include 1 or 10.

The processing performed in step S2 involves modifying a value of at least one color component of the pixel. This modification furthermore preferably involves changing the value of the at least one color component in such a way that the non-linear representation of the color is cheaper to code in terms of number of bits. Thus, an objective of the processing of the identified pixel in step S2 is modify or change the value of at least one color component of the identified pixel in such a way that the pixel is cheaper to encode and where the change or modification does not significantly deteriorate the visual quality as assessed in the luminance and chrominance based representation.

For instance, a small change in the linear representation of the color of the pixel, i.e. smaller than the first threshold value, that does not cause any large change in the luminance and chrominance based representation of the color, i.e. is smaller than the third threshold value, leads to a change in the non-linear representation of the color, larger than the second threshold value, that implies that the non-linear representation is cheaper to code. This small change could, as an example, modify the value of the non-linear representation of the color so at least one color component of the non-linear representation of the color is equal to a prediction value or at least close to its prediction value. This implies that the residual calculated as a difference between the value of the at least one color component and its prediction value is equal to or at least close to zero. In such a case, the at least one color component value can be encoded with very few bits.

Generally, the closer the value of a color component in the non-linear representation is to its prediction value, either using intra or inter prediction, the fewer bits are required to encode the value and the color component. Thus, the variation in the linear representation preferably results in change in the value of at least one color component in the non-linear representation that implies that the residual for that color component is zero or at least close to zero.

The processing performed in step S2 could be performed according to various embodiments, which are further described herein. A typical example of processing that modifies the value of at least one color component of the pixel is to apply a filter to the at least one color component. For instance, the at least one color component could be filtered heavily in order to remove or at least reduce or suppress variations in the at least one color component in a local area within the picture. Another example is to replace the value of the at least one color component by a predetermined or fixed value.

In an embodiment, step S1 of FIG. 1 comprises identifying a pixel in the picture having a value of a color component of the linear representation of the color that is smaller than a fourth threshold value and for which a ratio between the value of the color component and a value of another color component of the linear representation of the color is smaller than a fifth threshold value.

Non-limiting but illustrative examples of values for the fourth and fifth thresholds are 4 and 0.5, respectively.

For example, if the value of a first component of the linear representation of the color, such as RGB representation, is smaller than the fourth threshold value, and the ratio between the value of the first component and the value of a second component of the linear representation of the color, such as RGB representation, is smaller than the fifth threshold value, it is determined that the pixel can be varied in a way that is hard to see for the human eye yet can create variations in the non-linear representation of the color that are significant.

In an alternative or additional embodiment, step S1 of FIG. 1 comprises identifying a pixel in the picture having a value of a color component of the linear representation of the color that is smaller than a fourth threshold value and for which a value of at least one color component of the linear representation of the color is larger than a sixth threshold value.

A non-limiting but illustrative example of a value for the sixth threshold is 10.

In a particular embodiment, step S1 comprises identifying a pixel in the picture having the value of the color component of the linear representation of the color that is smaller than the fourth threshold value and for which the value of the at least one other color component of the linear representation of the color is equal to or larger than a factor times the value of the color component of the linear representation of the color. The factor is larger than one.

For instance, the pixel could be a pixel having the value of one RGB components smaller than 4 $cd/m^2$ (fourth threshold value) and the values of the other RGB components being at least twice as large as the one RGB component, i.e. factor is equal to two.

In an alternative or additional embodiment, step S1 of FIG. 1 comprises identifying a pixel to processed in the picture for which a variation in the linear representation, such as RGB or XYZ, of the color is smaller than the first threshold value results in a variation in a Y'Cb'Cr' representation of the color that is larger than the second threshold value. The variation in the linear representation, such as RGB or XYZ, of the color also results in a variation in a PQ(Y)u'v' or PQ(Y)xy representation of the color that is smaller than the third threshold value.

The representations PQ(Y)u'v' or PQ(Y)xy are all luminance and chrominance based representations and are furthermore perceptual representations, i.e. color spaces that the human visual system can perceive.

In a particular embodiment, the linear representation of the color is a RGB representation of the color. In such an embodiment, step S1 comprises, see FIG. 3, calculating, in step S20 and for the pixel, an instability coefficient ($C_i$) based on the derivative of a luma component Y', a chroma component Cb' and a chroma component Cr' with respect to at least one color component in the RGB representation of the color and the derivative of a luminance based component PQ(Y) and chrominance based components u'v' or xy with respect to the least one color component in the RGB representation. The method also comprises, see step S21, selecting the pixel to be processed if the instability coefficient is higher than a sevenths threshold value (T7).

Non-limiting but illustrative examples of a value for the seventh threshold are 1, 4 and 10.

In a particular embodiment, step S20 comprises calculating the instability coefficient $C_i$ based on:

$$\frac{\left\| w_1 \frac{\partial Y'}{\partial A}, w_2 \frac{\partial Cb'}{\partial A}, w_3 \frac{\partial Cr'}{\partial A} \right\|^2}{\left\| w_4 \frac{\partial PQ(Y)}{\partial A}, w_5 \frac{\partial u'}{\partial A}, w_6 \frac{\partial v'}{\partial A} \right\|^2} = \frac{w_1^2 \frac{\partial Y'^2}{\partial A} + w_2^2 \frac{\partial Cb'^2}{\partial A} + w_3^2 \frac{\partial Cr'^2}{\partial A}}{w_4^2 \frac{\partial PQ(Y)^2}{\partial A} + w_5^2 \frac{\partial u'^2}{\partial A} + w_6^2 \frac{\partial v'^2}{\partial A}}$$

or $$\frac{\left\| w_1 \frac{\partial Y'}{\partial A}, w_2 \frac{\partial Cb'}{\partial A}, w_3 \frac{\partial Cr'}{\partial A} \right\|^2}{\left\| w_4 \frac{\partial PQ(Y)}{\partial A}, w_5 \frac{\partial x}{\partial A}, w_6 \frac{\partial y}{\partial A} \right\|^2} = \frac{w_1^2 \frac{\partial Y'^2}{\partial A} + w_2^2 \frac{\partial Cb'^2}{\partial A} + w_3^2 \frac{\partial Cr'^2}{\partial A}}{w_4^2 \frac{\partial PQ(Y)^2}{\partial A} + w_5^2 \frac{\partial x^2}{\partial A} + w_6^2 \frac{\partial y^2}{\partial A}}$$

wherein $w_1 \ldots w_6$ are non-zero weights or absent, i.e. equal to one, and A represents one of a red color component R, a green color component G and a blue color component B in the RGB representation. The weights can set the importance of respective color component for the calculation of the instability coefficient.

As an example, in the PQ(Y)xy color space PQ(Y) can vary from 0 to 1, but x can only vary from 0.15 to 0.64, a distance of 0.64−0.15=0.49. Similarly y can only vary from 0.06 to 0.60, a difference of 0.54. Therefore a change in x and y may be around twice as important as a change in PQ(Y). This would suggest, for instance, $w_4=1.0$, $w_5=2.0$, $w_6=2.0$.

In the above example we have not fully taken advantage of the fact that the human visual system is more sensitive to luminance changes than to chrominance changes. Therefore, it may be wise to lower w5 and w6, even to values lower than 1.0.

The following example illustrates this, but in the PQ(Y) u'v' color space. Here it is well-known that if we quantize PQ(Y) to 11 bits and u' and v' to 9 bits the result is indistinguishable from the original. Since u' and v' vary from 0 to 0.62, this means that a change of $(\frac{1}{2}^9)*0.62=0.0012109375$ is virtually indistinguishable for u' and v'. Similarly, since PQ(Y) varies from 0 to 1, a change of $(\frac{1}{2}^{11})*1=0.00048828125$ should be virtually indistinguishable for PQ(Y). Hence w4=1.0, w5=w6=(0.00048828125/0.0012109375)=0.40322580645 may be a good trade-off for PQ(Y).

Typically Cb' and Cr' are subsampled, which means that the variability in these components may be extra troublesome; if there is no variability in Cb' and Cr', then subsampling will not change anything and luminance artifacts may be avoided. This means that a higher weight in w2 and w3 may be beneficial, such as w1=1.0, w2=4.0, w3=4.0. In another application it may be sufficient to look at the changes in Y', meaning that we could use w1=1.0, w2=0.0, w3=0.0.

Figure 3:
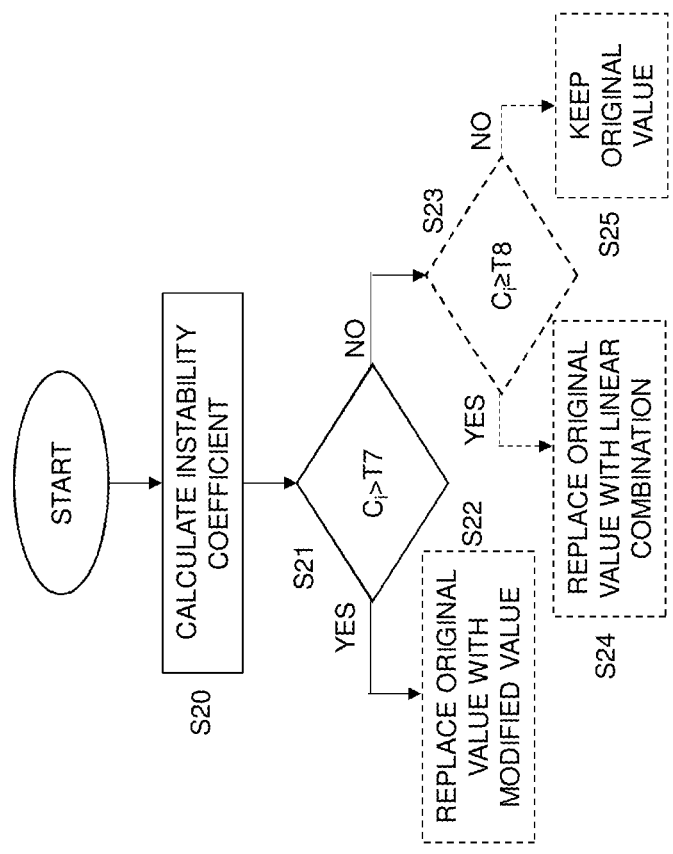
FIG. 3 is a flow chart illustrating a method of processing pixels in a picture according to another embodiment.

In an embodiment, the processing in step S2 of FIG. 1 comprises, see FIG. 3, replacing, in step S22, an original value of at least one color component of the pixel with a modified value of the at least one color component if the instability coefficient is higher than the seventh threshold value. In this embodiment, the original value of the at least one color component is replaced in step S24 with a linear combination of the original value of the at least one color component and the modified value of the at least one color component if the instability coefficient is equal to or smaller than the seventh threshold value but is equal to or larger than an eighth threshold value (T8). Correspondingly, the original value of the at least one color component is kept in step S25 if the instability coefficient is smaller than the eights threshold value.

A non-limiting but illustrative example of a value of for the eighth threshold is 1000, especially if the weights w1 to w6 are all equal to 1.0.

The method may therefore comprise the optional step S23 that compares the instability threshold value with the eight threshold value.

The linear combination used in step S24 may be defined as $(1-\alpha)\times$(original value)$+\alpha\times$(modified value). In an embodiment, $\alpha=(C_i-T7)/(T8-T7)$. In another embodiment, $\alpha=(\sqrt{C_i}-T7)/(T8-T7)$. Thus, in a general embodiment the parameter a is calculated based on or as a function of the instability coefficient, and preferably based on or as a function of the instability coefficient and the seventh and eighth threshold values.

In an embodiment, processing the identified pixel in step S2 comprises processing the identified pixel by modifying a value of at least one color component of the linear representation of the color. For instance, if the linear representation is an RGB representation of the color of the pixel, then the modification in step S2 is a modification of the value of the R component, the G component, the B component, or a modification of the values of two or even three of three R, G, B components.

In an embodiment, processing the identified pixel comprises modifying the value of the at least one color component of the pixel by filtering the at least one color component with a filter having filter coefficients that depend or are based on the instability coefficient.

The filter coefficient can for example be set to $1/C_i$ for that pixel and the weighted sum of respective filter coefficient multiplied with pixel value is then divided by the sum of the filter coefficients. Thus, pixels with large instability coefficients will have less influence on the filtered value than pixels with small instability coefficients. Another alternative is to set the weight to 0 for pixels with instability coefficients larger than a threshold, for example T7, and set the weight to 1 for other pixels, thus only pixels that are reliable will have influence on the filtered value.

In an embodiment, step S2 of FIG. 1 is performed as shown in step S31 of FIG. 4. This step S31 comprises replacing the value of the at least one color component of the pixel with a weighted average of values of the at least one color component of neighboring pixels in the picture.

The neighboring pixels could be adjacent pixels in the picture. For instance, assume that a current pixel has pixel number (i, j) in the picture. In such a case, neighboring pixels could be pixels with pixel numbers (i−1, j−1), (i−1, j), (i−1, j+1), (i, j−1), (i, j+1), (i+1, j−1), (i+1, j) and (i+1, j+1) as an illustrative example. Hence, the neighboring pixels could be pixels present within an area, such as square, in the picture centered at the position of the current pixel within the picture. In the illustrative example above, the square has a size of 3×3 pixels. Other sizes, such as 2×2 pixels, with the current pixel in one of the corners, or larger sizes, such as 4×4 or even larger, are also possible.

In an alternative embodiment, neighboring pixels are pixels belonging to a same coding unit (CU), prediction unit (PU) or transform unit (PU) as the current pixel in the picture.

In the embodiments above, the neighboring pixels are predetermined with regard to their positions in the picture relative to the position of the current pixel within the picture. In other embodiments, the neighboring pixels in the picture are identified as schematically shown in step S30 of FIG. 4. This step S30 comprises identifying neighboring pixels in the picture for which a variation in a linear representation of a color of the neighboring pixel that is smaller than the first threshold value results in a variation in a non-linear representation of the color of the neighboring pixel that is larger than the second threshold value. The variation in the linear representation of the color of the neighboring pixel also results in a variation in a luminance and chrominance based representation of the color of the neighboring pixels that is smaller than the third threshold value.

Hence, in an embodiment the same criteria that are used to identify the current pixel in step S1 in FIG. 1 are used in identifying neighboring pixels in step S30 in FIG. 4.

The method then continues to step S31, which comprises replacing the value of the at least one color component of the pixel with a weighted average of values of the at least one color component of the identified neighboring pixels in the picture.

This embodiment assumes that only neighboring pixels that are "similar" to the current pixel are included in the averaging. Similar here means that the colors of the neighboring pixels meet the same criteria as the current pixel.

In another embodiment, step S30 in FIG. 4 comprises identifying neighboring pixels in the picture for which an absolute difference between a value of a luminance based component of the pixel and a value of a luminance based component of the neighboring pixel is equal to or smaller than a ninth threshold value. Furthermore, a respective absolute difference between respective values of chrominance based components of the pixel and respective values of chrominance based components of the neighboring pixel is equal to or smaller than a tenth threshold value.

In this embodiment, the identification of step S30 comprises the investigations $|PQ(Y_2)-PQ(Y)|\leq T9$ and $|u'_2-u'|T10$ and $|v'_2-v'|\leq T10$, or $|x_2-x|\leq T10$ and $|y_2-y|\leq T10$, wherein T9 and T10 represent the ninths and tenth threshold values and the components without subscript denote luminance or chrominance based components of the pixel and the components with subscript 2 denote luminance or chrominance based components of the neighboring pixel.

If we use PQ(Y)xy, T9 could, in illustrative but non-limiting examples be 0.1 or 1, whereas T10 could be 0.05 or 1.

The neighboring pixels to test in step S30 and as described in the embodiments above could be pixels within the whole picture, pixels within the same slice as the current pixel, pixels within a same coding unit (CU), prediction unit (PU) or transform unit (TU) as the current pixel, or pixels in the picture present within an area, such as square, centered at the position of the current pixel as mentioned in the foregoing.

Figure 5:
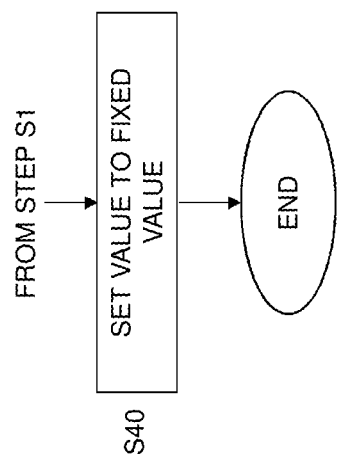
FIG. 5 is a flow chart illustrating another embodiment of the processing step in FIG. 1.

FIG. 5 is a flow chart illustrating an embodiment of step S2 in FIG. 1. In this embodiment, the method continues from step S1 in FIG. 1 to step S40 in FIG. 5. Step S40 comprises setting the value of the at least one color component to a fixed value, such as zero or determined based on the linear representation of the color. For instance, the value of the at least one color component of the linear representation of the color could be used to select between a number of fixed values. For instance, if the value is within a first interval the value is set to a first fixed value, if the value is within a second, different interval the value is set to second fixed value, and so on.

As an example, for colors where the smallest component is much smaller than the other, such as in the case RGB= (4000, 100, 0.01), it may be possible to snap the smallest component to 0. Alternatively, it is possible to use a small but nonzero value such as 0.1, 1 or 10, which will reduce the instability of the pixel.

Figure 6:
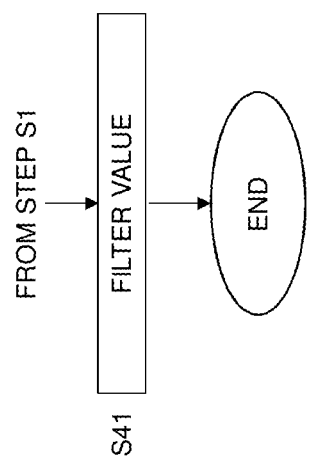
FIG. 6 is a flow chart illustrating a further embodiment of the processing step in FIG. 1.

FIG. 6 is a flow chart illustrating another embodiment of step S2 in FIG. 1. In this embodiment, the method continues from step S1 to step S41, which comprises filtering the value of the at least one color component of the pixel.

In an embodiment, step S41 comprises filtering the value of the at least one color component of the pixel with a filter having filter coefficients that are determined based on the previously mentioned instability coefficient. For instance, the filter coefficient could be inversely proportional to the magnitude of the instability coefficient.

In the foregoing, a value of at least one color component of the pixel is potentially modified if the pixel meets two criteria. In a typical embodiment, one of the color components is modified, preferably the color component with the smallest value. However, in some cases more than one, such as two or all three color components of the pixel could be modified.

The pre-processing of the embodiments is preferably performed for at least one pixel in the picture. Each pixel could be tested in step S1 to determine if the pixel should be modified or not. Hence, for a picture one or several of the pixels could be identified in step S1 and modified in step S2, whereas one or several other pixels of the picture do not meet the criteria tested in step S1 and are thereby not modified in step S2. This is illustrated by the line L1 in FIG. 1.

Figure 7:
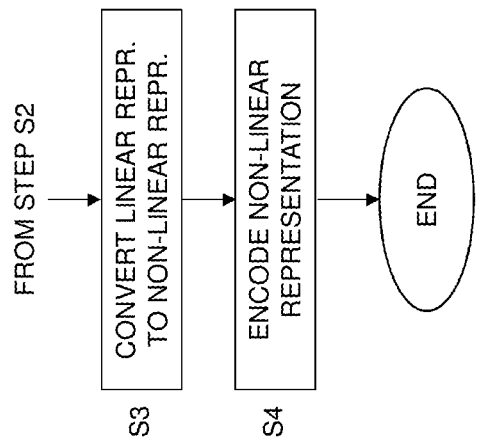
FIG. 7 is a flow chart illustrating an additional step of the method shown in FIG. 1 to form a method of encoding a pixel according to an embodiment.

A further aspect of the embodiments relates to a method of encoding a pixel in a picture of a video sequence comprising multiple pictures. The method comprises processing the pixel according to any of the embodiments, such as disclosed in steps S1 and S2 of FIG. 1, to modify a value of at least one color component of the pixel in a linear representation of the color of the pixel. The method also comprises, see FIG. 7, converting, in step S3, the linear representation of the color into a non-linear representation of the color of the pixel. The method further comprises encoding the non-linear representation of the color in step S4.

The conversion in step S3 is performed after the value of the at least one color component of the pixel has been modified in step S2.

In an embodiment of the method of encoding, the value of at least one of the RGB components of a pixel identified according to the described embodiments is modified. The modified RGB representation 4:4:4 is then preferably converted into a Y'Cb'Cr' representation 4:2:2 or 4:2:0. This conversion typically involves application of a transfer function, such as the inverse of the transfer function defined in equation A1 in Annex A, to obtain a non-linear R'G'B' representation 4:4:4. Then a color transform is applied to the R'G'B' representation 4:4:4 to obtain a Y'Cb'Cr' representation 4:4:4. Thereafter, the non-linear chroma components Cb'Cr' are subsampled to obtain the Y'Cb'Cr' representation in the 4:2:2 or 4:2:0 format.

According to an aspect, a method and a converter is provided for conversion from a first color representation to another color representation. The converter receives a bitstream representing at least a first pixel in the first color representation. The converter is configured to determine if varying the pixel in a way that is hard to see for a human eye, also referred to as visible, can create variations in the second color representation that are significant. Such a determination may be done according to any of the methods described herein.

For example, if a first component in a RGB representation is smaller than a predetermined threshold, and the ratio between the first component and a second component in the RGB representation is smaller than another predetermined threshold, it is determined that the pixel can be varied in a way that is hard to see for the human eye yet can create variations in the second color representation that are significant.

According to an embodiment, the conversion is performed before encoding with the following color representations:
First color representation: RGB
Second color representation: Y'Cb'Cr'

In an alternative embodiment the conversion is performed after decoding when another transmission format is used but when the display needs Y'Cb'Cr' with the following color representations:
First color representation: Log luv
Second color representation: Y'Cb'Cr'

In an example, the conversion is performed after decoding when encoding preprocessing did not do its job right when creating Y'Cb'Cr' with the following color representations:
First color representation: Y'Cb'Cr'
Second color representation: Y'Cb'Cr'

When it is determined that the pixel can be varied in a way that is hard to see for the human eye yet can create variations in the second color representation that are significant, the pixel is processed to remove potential such variability. Such a processing may be done according to any of the methods described herein. For example, the smallest component in the RGB color representation can be set to a fixed value. Another possibility is to replace the smallest component in said RGB color representation with a weighted average of the smallest component of neighboring pixels.

In this way variability in Y'Cb'Cr' is avoided that cannot be seen anyway, and which can create problems during the encoding and decoding.

A typical compression chain, denoted anchor processing chain herein, is the one described for anchor generation in [2]. The incoming linear light pixel (R, G, B) ranging from 0 to 10000 is first fed to a transfer function, according to Section B.1.5.3.1 in [2]:

$R'=\text{PQ\_TF}(\max(0,\min(R/10000,1)))$ $G'=\text{PQ\_TF}(\max(0,\min(G/10000,1)))$ $B'=\text{PQ\_TF}(\max(0,\min(B/10000,1)))$ where $$PQ_{TF(L)} = \left(\frac{c_1 + c_2 L^{m_1}}{1 + c_3 L^{m_1}}\right)^{m_2},$$

$m_1=0.1593017578125$, $m_2=78.84375$, $c_1=0.8359375$, $c_2=18.8515625$, and $c_3=18.6875$. In this document we will use PQ(x) as a shortcut for doing the PQ_TF(max(0, min (x/10000,1))), hence R'=PQ(R), G'=PQ(G) and B'=PQ(B).

This results in a new pixel representation (R', G', B') between 0 and 1. After this, the pixel undergoes color transform resulting in Y'Cb'Cr'. As an example, if the color space is Rec.709, then the Y'Cb'Cr' components are calculated as:

$Y'=0.212600*R'+0.715200*G'+0.072200*B'$ $Cb'=-0.114572*R'-0.385428*G'+0.500000*B'$ $Cr'=0.500000*R'-0.454153*G'-0.045847*B'$

Alternatively, if the color space is Rec.2020, then the Y'Cb'Cr' components are calculated as $Y'=0.262700*R'+0.678000*G'+0.059300*B'$ $Cb'=-0.139630*R'-0.360370*G'+0.500000*B'$ $Cr'=0.500000*R'-0.459786*G'-0.040214*B'$.

Then the Y'Cb'Cr' components are quantized to a fixed number of bits, according to B.1.5.4 in [2]. After this, the Cb' and Cr' components are subsampled to 4:2:0 according to B.1.5.5 in [2]. Then Cb' and Cr' are upsampled to 4:4:4 according to B.1.5.6, inverse quantized according to B.1.5.7, converted to RGB as in B.1.5.8 and finally converted to linear RGB by inverse PQ in B.1.5.9.

We will now see what happens to two pixels when processed using the above processing chain.

As an example, assume that we have a pixel with the color RGB1=(1000, 0.1, 100). We will now see what happens if we vary the color of this pixel slightly so that it assumes the color RGB2=(1000, 0.2, 100) instead.

Following the anchor generation procedure, the first thing is the application of the transfer function PQ(.), which gives the R'G'B' values (0.751827, 0.062337, 0.508078) and (0.751827, 0.082836, 0.508078) respectively. After conversion to Y'Cb'Cr' and quantization to 10 bits we get Y'Cb'Cr'= (275, 641, 803) and (288, 634, 794). As can be seen, this is quite a big variation; Y' varies 13 steps and Cb' and Cr' varies 7 and 9 steps, respectively. This will be quite expensive to code for the video encoder.

Yet the difference between these two colors would not be possible to see.

It is well understood how humans perceive differences in luminance. For a big luminance, i.e. very bright color, absolute errors can be quite big, but relative errors must be kept small. For small luminances the opposite is true. This can be expressed using what is called Barten's formula. As a rule of thumb, if the luminance is calculated, fed through a transfer function that approximates Barten's formula and quantized to 11 bits, it will not be possible to see any differences.

We now apply this to our two colors. First we compute the linear luminance Y from the original luminance values RGB using Y=0.212639*R+0.715169*G+0.072192*B.

Note that here we have used the definition from B.1.5.9.3 from [2] for the Y-component, which has slightly different rounding than that for computing Y' in Y'Cb'Cr' in B.1.5.3.2 from [2]. This is likely just a rounding error in B.1.5.3.2, but we have kept the same numbers as in [2] in both cases.

The luminance of the two colors above are 219.929717 and 220.001234, respectively. If we approximate Barten's formula with the PQ(.) above and quantize to 11 bits by multiplying by $2^{11}-1=2047$, we get 1205.840435 and 1205.910257, which means that both of them would be represented by the same code word 1206 if quantized to 11 bits. This means that in terms of luminance, the difference between the two colors would be invisible.

Next, we look at the difference in chrominance. Here, as a rule of thumb, 9-bit quantization of the u' and v' coefficients is sufficient to have transparent quality. The u'v' coordinates are obtained from XYZ through $u'=4X/(X+15Y+3Z)$ $v'=9Y/(X+15Y+3Z)$ and X, Y Z is obtained from Rec.709 RGB through $X=0.412391*R+0.357584*G+0.180481*B$ $Y=0.212639*R+0.715169*G+0.072192*B$ $Z=0.019331*R+0.119195*G+0.950532*B$.

When converting our two colors to u'v' and multiplying by $2^9-1=511$ we get (216.050845, 248.355974) and (216.008101, 248.366952). As can be seen, the difference is smaller than 1 in both u' and v' and it is therefore not possible to spot the difference between the two chrominances.

Since it is not possible to see the difference neither in luminance nor chrominance, it is simply not possible to spot the difference at all. Yet the representation changes 13 steps in Y' and 6 or 7 in Cb' Cr'. This means that if the general color in an area is (1000, 0.15, 100) but varies from pixel to pixel+/− (0, 0.05, 0), the encoder must spend bits to encode a difference that cannot be seen.

Looking at the RGB numbers of the two colors, (1000, 0.1, 100) and (1000, 0.2, 100), it makes sense that these two colors are impossible to visually differentiate. That the general brightness is not changed much is reasonable; the extra strength of the green component will be drowned by the bright red and blue, which are 10000 and 1000 times larger. Also, that the chrominance will not change much from adding a bit of green light to red and blue lights that are so much stronger also makes sense.

The situation is very different if the red and blue components are lower. If we carry out the same calculations with the two colors RGB1=(0.1, 0.1, 0.2) and RGB2=(0.1, 0.2, 0.2) we get the following numbers:

PQ(0.212639*0.1+0.715169*0.1+0.072192* 0.2)*2047=131.4072

PQ(0.212639*0.1+0.715169*0.2+0.072192* 0.2)*2047=162.1153

This is a difference of 31 steps, where 1 step is a just noticeable difference. This means that this difference in luminance can very likely be spotted.

As for the chrominance, we get $u'$*511=99.0733,$v'$*511=211.3358 for the first color, and $u'$*511=87.4913,$v'$*511=236.3768 for the second color.

This is a difference of around 11 and 25 steps, which means the chrominance difference may very well be possible to see. Given the quite low luminance of between 0.1 and 0.2 cd/m$^2$, it is not certain that the difference in chrominance is noticeable, but at least it cannot be ruled out as in the first example.

If we convert these two colors to 10 bit-Y'Cb'Cr as described above, we get (120, 521, 511) and (133, 514, 503), a difference of 13, 7 and 8.

So in both the first and the last case we have a difference in Y'Cb'Cr', which is about the same (13, 7, 9) versus (13, 7, 8). However, in the first case there is no visible difference, whereas in the second case the difference can be easily seen at least in luminance. In this document we will refer to colors of the first kind as "first case colors" and colors of the second kind as "second case colors". We will also refer to "first case pixels", which means a pixel with a first case color, and to "second case pixels", which means a pixel with a second case color.

In embodiments, the original signal is treated in a manner so that the differences in the first case are removed, whereas the differences in the second case are kept. By doing so, the Y'Cb'Cr' representation will be flat, i.e. needing no or few bits to code, in the first case, whereas it will be varying in the second case, where the variation is actually visible.

Figure 8:
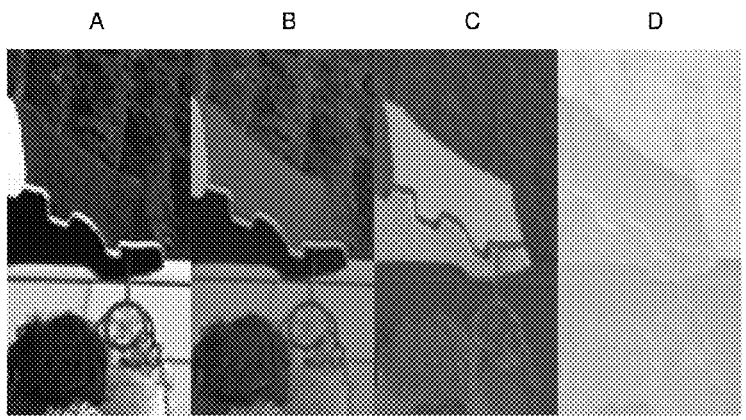
FIG. 8 illustrates a tone-mapped version of an original image (A), linear luminance Y treated with PQ(.) to bring out details (B), u' (C) and v' (D)

A real-world example is shown in FIGS. 8A-8D. Here FIG. 8A shows a low dynamic range (LDR) or tonemapped part of a picture or image. Concentrate on the awning. It looks as if the color is more or less flat there. This is also confirmed in FIGS. 8B-8D. FIG. 8B shows PQ(.) of the Y component in XYZ, which looks flat, and FIGS. 8C and 8D show the u' and v' coordinates respectively, which also look flat.

Figure 9:
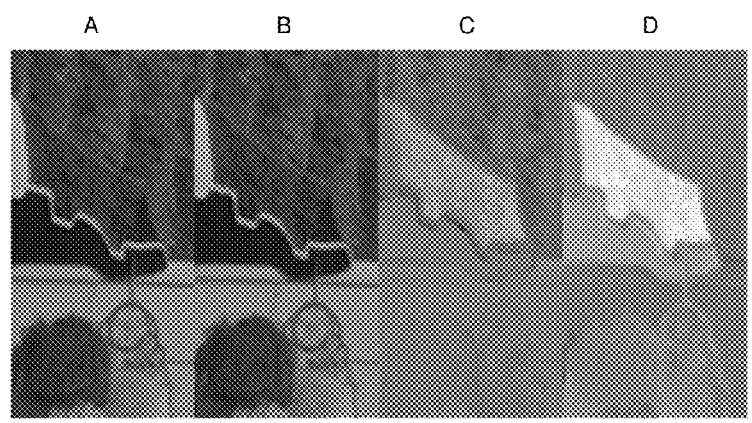
FIG. 9 illustrates the R'G'B' version of the image, i.e. after application of the non-linear PQ(.) function to each component (A), the Y' component (B), Cb' (C) and Cr' (D)

FIG. 9A shows the R' G' B'-version of the image where R'=255*PQ(R). It is possible to start seeing some variation in the awning area, this is due to the fact that the PQ(x)-function rises very quickly for small values of x, hence strengthening the noise in the green component.

Figure 10:
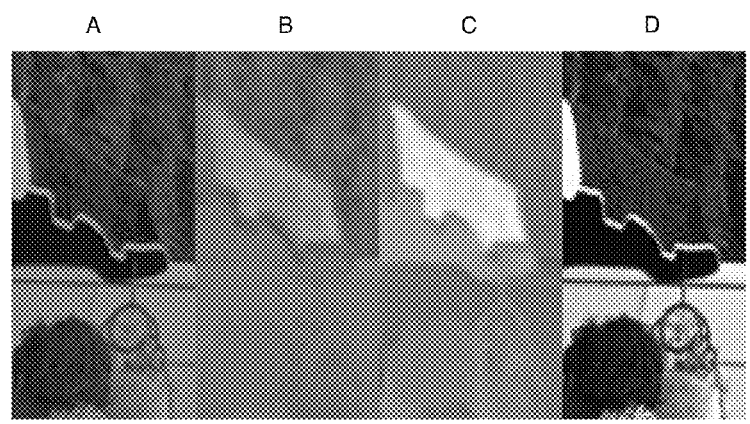
FIG. 10 illustrates the same Y' as in FIG. 9B (A), subsampled Cb' component (B), subsampled Cr' component (C) and a tonemapped version of the resulting image (D)

In FIGS. 9B-9D, the Y', Cb' and Cr' components are shown. Notice how they are varying wildly in the awning area, even though FIGS. 8A-8D indicate that there is really nothing happening neither in luminance nor chrominance. The standard, i.e. anchor, way of encoding now proceeds to subsample the Cb' and Cr' components, and keeps the Y' as is. This is shown in FIGS. 10A-10D. Now, since a subsampled Cb' value is the average of two very different Cb' values, the result will be a Cb' value that does not fit the Y'-value in either pixel. This will give rise to a clearly visible noise as shown in FIG. 10D, which is the PQ(.) applied on the linear Y component. It is also clearly visible in the LDR (tonemapped) version of the image. FIG. 10A illustrates the same Y' is used as in FIG. 9B. FIGS. 10B and 100 show the subsampled Cb' and Cr' components.

Figure 11:
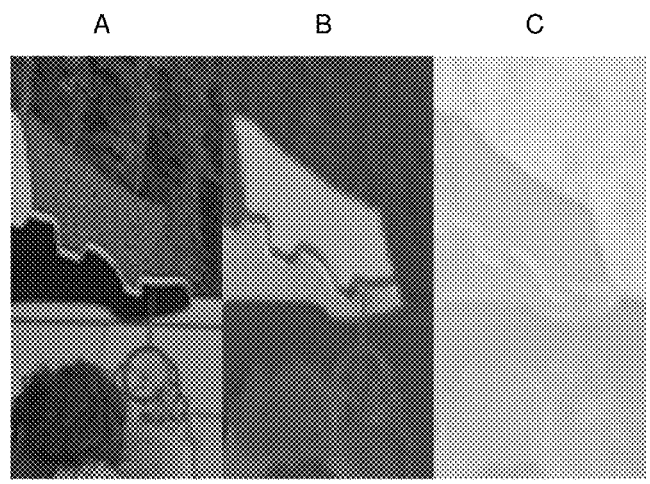
FIG. 11 illustrates the PQ(Y) of the anchor image (A), u' component (B) and v' component (C)

The PQ(Y), u' and v' components of the resulting image are shown in FIGS. 11A-11C, and we see clear artifacts especially in the luminance.

One way to understand this is that the Y' component previously, in FIG. 9B, had to compensate for the large swings in Cb' and Cr', and when Cb' and Cr' are no longer swinging violently, due to being subsampled, the large swings in Y' instead bring artifacts to the image.

One way to counteract this problem has been presented in the Ajusty method of Annex A, where we find the Y' that would bring the correct linear light Y. Often this means that the wild swings in Y' are dampened a bit, making Y' easier to code. This approach is shown in FIGS. 12A-12E. Comparing FIG. 12A with FIG. 10A, it is clear that the Ajusty method has made the Y' vary less, but it is still not flat.

Figure 12:
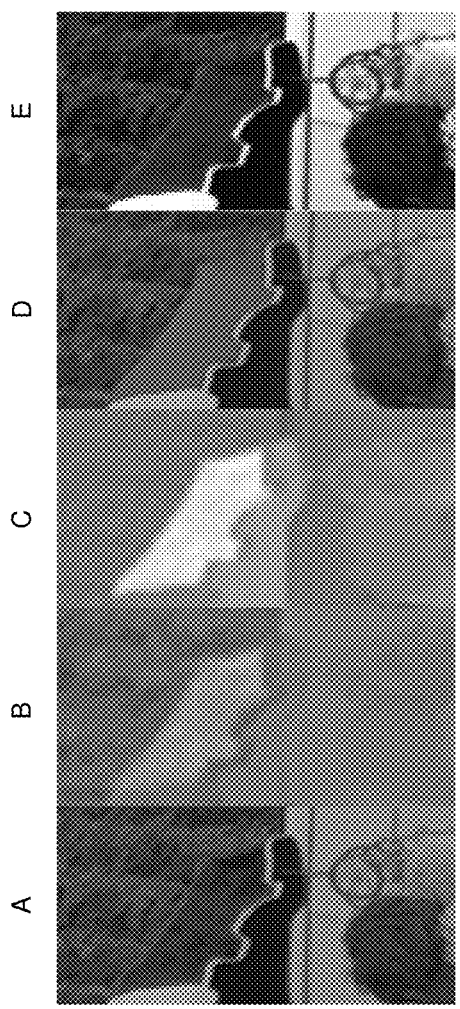
FIG. 12 illustrates the corrected Y' using the Ajusty method of Annex A (A), Cb' component (B), Cr' component (C), PQ(Y) and a tonemapped version of the resulting image (E)

FIG. 12A illustrates the corrected Y' using the Ajusty method of Annex A. Note how the Y' component now is much calmer and thus easier to code, but still not flat in the relevant area. This is due to the remaining swings in Cb' and Cr', which are shown in FIGS. 12B and 12C. The resulting linear luminance Y is perfect, as can be seen in FIG. 12D where PQ(Y) is shown. Also the tonemapped image FIG. 12E looks good.

The lesson here is that while using the Ajusty method of Annex A improves the situation, there may still problems. Firstly, there is still some variation in Cb' and Cr' as shown in FIGS. 12B and 12C, which will cost bits to code. It will also mean that the Ajusty method of Annex A has to compensate by varying Y', see FIG. 12A. Even though this variation is much less than before, see FIG. 10A, this is still generating bits that are expensive to code.

Furthermore, the coding process is lossy, so the Y' will not be preserved perfectly, thus re-introducing some artifacts, although much smaller than the original artifacts. Also, Cb' and Cr' will not be perfectly preserved, so even if the correct Y' were used it would not compensate perfectly since the Cb' and Cr' have changed.

Therefore, an object with the embodiments is to identify such problematic pixels, so called "first case pixels" using the terminology above, and reduce or remove the variation.

One way to do this is to identify pixels that are of the first kind and filter only those pixels. The "first case pixels" are characterized by two criteria:

1. Small variations in a linear representation, such as RGB or XYZ, give rise to large variations in Y'Cb'Cr'.
2. The variations themselves are not possible to see, i.e. they give rise to small variations in, for instance, PQ(Y)u'v'.

Assume that the data has been captured in linear RGB. Assume further that we have some noise in one of the components, say the green (G) component. The first criterion simply means that the derivative of Y'Cb'Cr' with respect to the green component is large:

Criterion 1: $\partial Y'/dG$ is large, $\partial Cb'/dG$ is large, $\partial Cr'/dG$ is large.

Likewise, the second criterion just means that the corresponding derivatives are small:

Criterion 2: $\partial PQ(Y)/dG$ is small, $\partial u'/dG$ is small, $\partial v'/dG$ is small.

These derivatives are straightforward to calculate, but a bit involved so they are not included here.

To get a measure of criterion 1, we can look at the length of the vector $(\partial Y'/dG, \partial Cr'/dG, \partial Cb'/dG)$. When this vector is long, we know that the signal representation is very sensitive to changes in G. Likewise, for criterion 2 we can look at the length of the vector (∂PQ(Y)/dG, ∂u'/dG, ∂v'/dG). When this vector is short, the image does not vary much with G. This means that we can get a measure for each pixel for how much unseen noise in G influences the pixel. We call this the instability coefficient $C_i$:

$$\text{instability coefficient} = C_i = \|(\partial Y'/dG, \partial Cr'/dG, \partial Cb'/dG)\|^2 / \|(\partial PQ(Y)/dG, \partial u'/dG, \partial v'/dG)\|^2 = ((\partial Y'/dG)^2 + (\partial Cb'/dG)^2 + (\partial Cr'/dG)^2) / ((\partial PQ(Y)/dG)^2 + (\partial u'/dG)^2 + (\partial v'/dG)^2)$$

Thus one embodiment is to calculate this instability coefficient for every pixel, and use it to select between the original green component G and a heavily smoothed version of G. If the instability coefficient is lower than a threshold, the original G is selected, and if the instability coefficient is higher than another threshold, then the smoothed version is selected. If the instability coefficient is between these two threshold, a convex combination $(1-\alpha)*origG + \alpha*smoothedG$ is used, where the value $\alpha$ is calculated as $\alpha=(C_i-th1)/(th2-th1)$, where th1 is the lower threshold and th2 is the higher threshold. Alternatively $\alpha=(\sqrt{(C_i)}-th1)/(th2-th1)$ can be used, or some other way to calculate $\alpha$ from $C_i$.

As an example, the $C_i$ can be estimated for RGB=(1000, 0.1, 100) to yield a $C_i$ of 42222. For the case where RGB=(0.1, 0.1, 0.2), the $C_i$ is approximately 0.1159. Therefore we can have thresholds of th1=1.0 and th2=1000. This would select only the smoothed G in the first case color and only the original pixel in the second case color.

In another embodiment the green component is filtered, and for each pixel, the filter coefficients depend on the instability coefficient $C_i$.

In a preferred embodiment an instability coefficient $C_i$ is calculated with respect to each one of the components individually, e.g.:

$$C_{iR} = ((\partial Y'/dR)^2 + (\partial Cb'/dR)^2 + (\partial Cr'/dR)^2) / ((\partial PQ(Y)/dR)^2 + (\partial u'/dR)^2 + (\partial v'/dR)^2)$$

$$C_{iG} = ((\partial Y'/dG)^2 + (\partial Cb'/dG)^2 + (\partial Cr'/dG)^2) / ((\partial PQ(Y)/dG)^2 + (\partial u'/dG)^2 + (\partial v'/dG)^2)$$

$$C_{iB} = ((\partial Y'/dB)^2 + (\partial Cb'/dB)^2 + (\partial Cr'/dB)^2) / ((\partial PQ(Y)/dB)^2 + (\partial u'/dB)^2 + (\partial v'/dB)^2)$$

The thresholds th1 and th2 could be the same for all components or weighted differently for each component based on how sensitive the human visual system (HVS) is to changes in each one of the components. For RGB, the thresholds may, for instance, relate to each other in the following way:

$$th1_R = (1-0.212639)*(th1_R+th1_G+th1_B)$$

$$th1_G = (1-0.715169)*(th1_R+th1_G+th1_B)$$

$$th1_B = (1-0.072192)*(th1_R+th1_G+th1_B)$$

$$th2_R = (1-0.212639)*(th2_R+th2_G+th2_B)$$

$$th2_G = (1-0.715169)*(th2_R+th2_G+th2_B)$$

$$th2_B = (1-0.072192)*(th2_R+th2_G+th2_B)$$

It is also possible to approximate the instability coefficient, as we will now show.

We start by looking at pixels where $\partial Y'/dG$ is high. We have $$R' = PQ(R)$$

$$G' = PQ(G)$$

$$B' = PQ(B)$$

and since $$Y' = 0.212600*R' + 0.715200*G' + 0.072200*B'$$

$$Cb' = -0.114572*R' - 0.385428*G' + 0.500000*B'$$

$$Cr' = 0.500000*R' - 0.454153*G' - 0.045847*B'$$

we have $$Y' = 0.212600*PQ(R) + 0.715200*PQ(G) + 0.072200*PQ(B).$$

Figure 13:
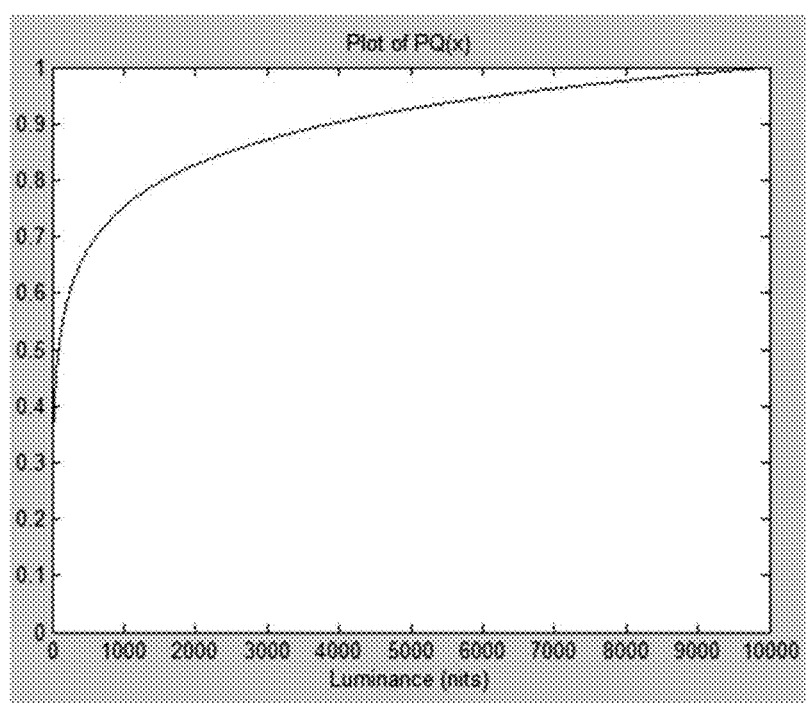
FIG. 13 illustrates a plot of the function PQ(x)

We see directly that only the middle term will contribute to $\partial Y'/dG$, since the other two terms do not depend on G at all. FIG. 13 plots PQ(x) for values from 0 to 10000. Note how the derivative is very large, i.e. the slope is very steep, for x-values close to 0.

Even without calculating the derivative of PQ(x), it is clear that it must be at its largest for small values of x. Therefore we can conclude:

$\|\partial Y'/dG\|$ is large when G is near 0.

We don't care about the sign of this derivative, hence the absolute value. In the same manner we can conclude that $\|\delta Cb'/dG\|$ is large when G is near 0, and $\|\partial Cr'/G\|$ is large when G is near 0.

Hence we can see that the entire first condition is fulfilled when G is near 0. What about the second condition? We are interested in the value PQ(Y), where $$Y = 0.212639*R + 0.715169*G + 0.072192*B.$$

Using the same reasoning as above, we see that $\|(\partial PQ(Y))/dG\|$ is large when Y is close to 0, and small when Y is far from zero. Assume that we have already fulfilled the first condition. That means that G is close to zero. To have Y be far from zero it must mean that either R or B, or both, are large values. Hence we have the following rule of thumb:

If G is close to zero while R or B, or both, are far from zero, we have a high instability coefficient, and we should remove the variability in G by, for instance, filter it heavily.

The same reasoning can be done for red and blue:

If R is close to zero while G or B, or both, are far from zero, we should filter R heavily.

If B is close to zero while R or G, or both, are far from zero, we should filter B heavily.

In all these cases we have a pixel that is close to the edge of the of the color gamut. Note, however, that some pixels can be close to the edge of the color gamut without being candidates for denoising simply because the smallest coefficient is not small enough to be in the steeply sloping part of the PQ( )-curve as shown in FIG. 13.

In the following examples, the green color component of a pixel is tested for variability. The same procedures could be replaced for the other two components, i.e. red and blue components.

Figure 14:
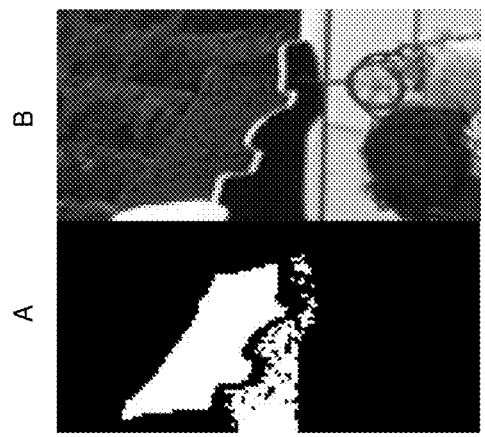
FIG. 14 illustrates the problem area identified using a simple pseudo code.

We can now put this theory into practice. For example, we can find all the pixels where G<4 cd/m$^2$, and both R and B are at least twice as large as G:

for all pixel positions x,y:
  if G(x,y)<4.0 AND G(x,y)<0.5*R(x,y) AND G(x,y)<0.5*B(x,y)
    mask(x,y)=1
  else
    mask(x,y)=0
  end
end The result is a mask where instable pixels, i.e. so called "first case pixels", are 1 or white, and normal pixels, i.e. so called "second case pixels" are 0 or black. As shown in FIGS. 14A and 14B, this captures the problem area quite well.

It is now possible to filter the green coefficient hard in this area. Note however, that we don't want to filter across edges; we only want to filter pixels that are similar. That can be done by looking in a neighborhood of the pixel, and take the average of all pixels in the neighborhood that are "first case pixels":

```
for all pixel positions x,y:
    val=0;
    num=0;
    for all pixel positions x2, y2 in a neighborhood of x,y
        if(mask(x2,y2)==1)
            val=val+G(x2,y2)
            num=num+1
        end
    end
    if num>=1
        Gblur(x,y)=val/num
    else
        Gblur(x,y)=G(x,y)
    end
end
```

Figure 15:
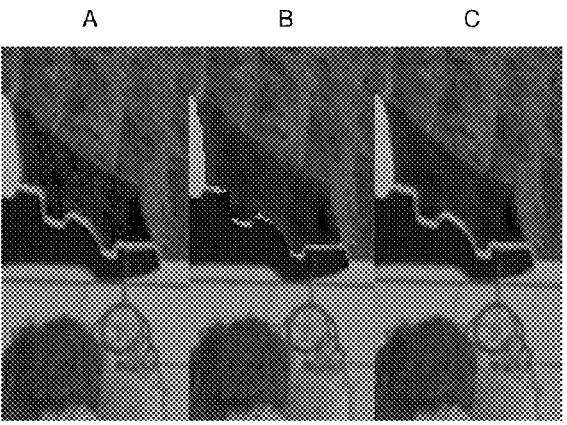
FIG. 15 illustrates the green component (PQ(G)) before blurring (A), after blurring (B) and the resulting image when selecting between the original and the blurred version (C)

We now have an original green component $G(x,y)$ and a blurred version $Gblur(x,y)$. FIGS. 15A and 15B show how the green component looks before and after blurring.

We can now select between the two using the mask:

```
for all pixel positions x,y
    if(mask(x,y)==1)
        G(x,y)=Gblur(x,y)
    end
end
```

The resulting G component is shown in FIG. 15C. After this, the regular steps of the chain are used: conversion from RGB to R'G'B' by application of a transfer function, from R'G'B' to Y'Cr'Cb' by application of a color transform, subsampling of Cb' and Cr', and then reversal of the chain to get back to RGB. The resulting image is shown in FIG. 16B.

Figure 16:
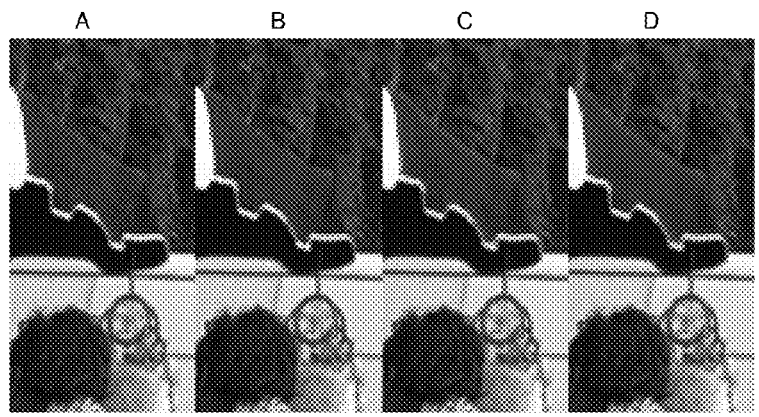
FIG. 16 illustrates an original image (tonemapped) (A), using proposed filtering (B), using Ajusty method of Annex A (C) and using proposed filtering followed by the Ajusty method of Annex A (D)

The result has much less noise in the awning, compare FIG. 16B with FIG. 9D, but it is not as good as using Ajusty method disclosed in Annex A, see FIG. 16C. This is because of the hard selection between $G(x,y)$ and $Gblur(x,y)$; it will create artifacts which can be seen along the edge of the awning area. Fortunately we can combine this with Ajusty method in Annex A, which is shown in FIG. 16D. This brings back the full quality of the luminance, and the resulting picture looks good. In an alternate embodiment we make a soft decision between $G(x,y)$ and $Gblur(x,y)$, for instance by making a soft mask:

```
for all pixel positions x,y:
    if G(x,y)>6.0 OR G(x,y)>0.75*R(x,y) OR G(x,y)>0.75*B(x,y)
        softmask(x,y)=0
    else if G(x,y)<2.0 AND G(x,y)<0.25*R(x,y) AND G(x,y)<0.25*B(x,y)
        softmask(x,y)=1
    else
        softmask(x,y)=(6-G(x,y))/4*(0.75-G(x,y)/R(x,y))/
            0.5*(0.75-G(x,y)/G(x,y))/0.5
    end
end
```

Now, this softmask can be used instead of the hard mask when selecting $G(x,y)$:

```
for all pixel positions x,y
    G(x,y)=softmask(x,y)*Gblur(x,y)+(1-softmask(x,y))*G(x,y)
end
```

Figure 17:
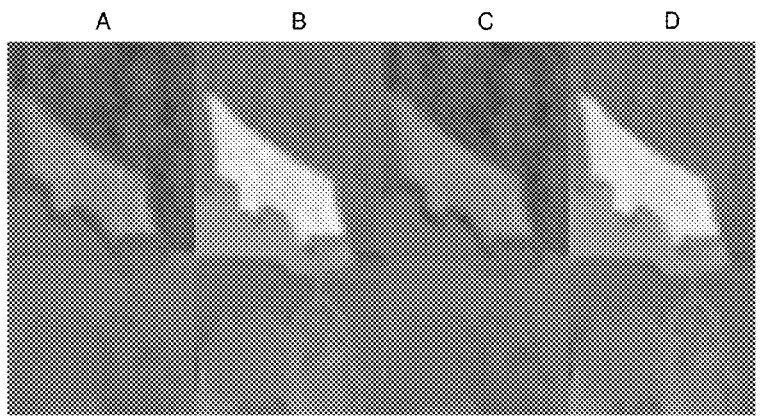
FIG. 17 illustrates Cb' of the Ajusty method of Annex A (A), Cr' of the Ajusty method of Annex A (B), Cb' of the proposed scheme (C) and Cr' of the proposed scheme (D)

What has then been gained compared to just using the Ajusty method of Annex A? Well, the good news is that Cb' and Cr' contain less variation and are therefore easier to code, as shown in FIGS. 17A-17D. FIGS. 17A and 17B illustrate Cb' and Cr' of the Ajusty method of Annex A. Notice how there is quite some variability. Cb' and Cr' of the proposed scheme are shown in FIGS. 17C and 17D. Notice how the variability is reduced.

Figure 18:
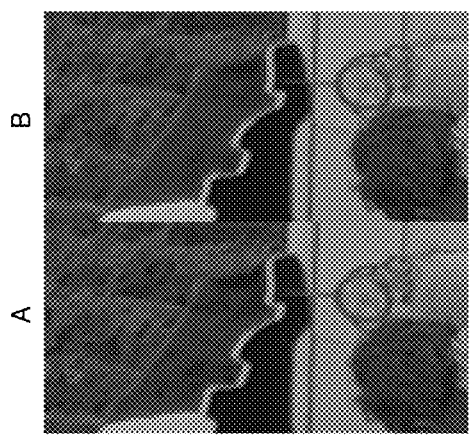
FIG. 18 illustrates the Y' component using the Ajusty method of Annex A (A) and the Y' component using the proposed scheme followed by the Ajusty method of Annex A (B)

The luminance is also varying less than for the Ajusty method of Annex A, as can be seen in FIG. 18A showing the Y' component using the Ajusty method of Annex A and FIG. 18B showing the Y' component using the proposed scheme followed by the Ajusty method of Annex A. Note how the variability has been lowered.

In the discussion above on how to filter the green component, after FIG. 13, we mentioned that to ensure that only similar pixels are being averaged, only "first case" pixels were included in the averaging. Actually this does not ensure averaging only similar pixels. As an example, both (1000, 0.1, 100) and (0.1, 1000 100) are first case pixels, but are very dissimilar. If they are next to each other, they would be averaged. One way to solve this is to compare every pixel in the neighborhood with the current pixel. If the change in G is small enough not to be visible, the neighborhood pixel is included in the averaging. However, if the change in G is large enough to be visible, the neighborhood pixel is not included. This can also be done in a soft manner by assigning a weight to each pixel in the neighborhood, the weight being smaller if the change in G would be close to visible and larger if the change in G would be far from being visible. The method described above could then be extended to the following.

```
for all pixel positions x,y:
    val=0;
    num=0;
    (X, Y, Z)=calculateXYZ(R(x,y), G(x,y), B(x,y))
    pqY=PQ(Y)*2047
    (u', v')=calculate_upvp(X, Y, Z)*511
    for all pixel positions x2, y2 in a neighborhood of x,y,
        including the pixel x,y itself
        (X2,Y2,Z2)=calculateXYZ(R(x2,y2), G(x2,y2), B(x2,y2))
        pqY2=PQ(Y2)*2047
        (u2', v2')=calculate_upvp(X2, Y2, Z2)*511
        if(abs(pqY2-pqY)<=1 AND abs(u2'-u)<=1 AND abs(v2'-v')<=1)
            val=val+G(x2,y2)
            num=num+1
        end
    end
    if num>=1
        Gblur(x,y)=val/num
    else
        Gblur(x,y)=G(x,y)
    end
end
```

In this case, since we have ensured that all changes are invisible, we can use G=Gblur without selecting according to the mask.

In yet an alternate embodiment, the line
(X2, Y2, Z2)=calculateXYZ(R(x2,y2), G(x2,y2), B(x2,
   y2)
above is exchanged to
(X2, Y2, Z2)=calculateXYZ(R(x,y), G(x2,y2), B(x,y))

Figure 19:
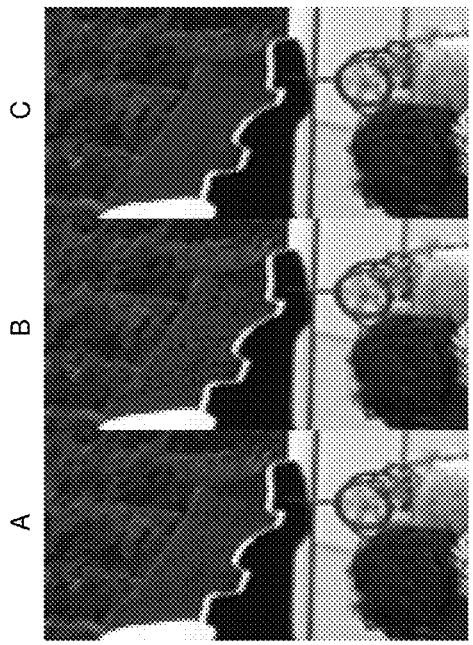
FIG. 19 illustrates a tonemapped original image (A), tonemapped anchor image (B) and averaging G over pixels that have a G that would not affect the PQ(Y) or u'v' more than 4 steps for the instable pixels, i.e. First case pixels (C)

It is also possible to relax the requirement that the change will be completely invisible by lowering the numbers 2047 and 511. In this case it may be a good idea to bring back the test so that we only use G=Gblur when we have an unstable pixel.
for all pixel positions x,y
   if(mask(x,y)==1)
     G(x,y)=Gblur(x,y)
   end
end As an example, in FIGS. 19A-19O we have used the value 511 instead of 2047 and the value 127 instead of 511. The mask was created using the condition G(x,y)<4.0 AND G(x,y)<0.5*R(x,y) AND G(x,y)<0.5*B(x,y) as done above. As can be seen in the tone-mapped image the noise is lowered considerably. FIG. 19A illustrates a tonemapped original image, FIG. 19B illustrates tonemapped image processed according to the anchor processing chain and FIG. 19C illustrates an image with averaging G over pixels that have a G that would not affect the PQ(Y) or u'v' more than 4 steps, for the instable pixels, i.e. first case pixels.

In yet another embodiment, we note that the instable pixel effect, i.e. first case pixel effect, will be strongest when G is small and R is big. This is due to the way Y is calculated from RGB:

$$Y=0.212639*R+0.715169*G+0.072192*B$$

The value $\|\partial PQ(Y)/dG\|$ depends on the coefficients in front of the components; for instance $\|\partial PQ(Y)/dG\|$ will be 10 times larger for (1000, 0.1, 100) than $\|\partial PQ(Y)/dB\|$ will be for (1000, 100, 0.1), simply because 0.715169 is 10 times larger than 0.072192. Hence the above rule of thumb can be changed to:

If 0.715169 G is close to zero while 0.212639 R or 0.072192 B, or both, are far from zero, we should filter G heavily.

If 0.212639 R is close to zero while 0.715169 G or 0.072192 B, or both are far from zero, we should filter R heavily.

If 0.072192 B is close to zero while 0.212639 R or 0.715169 G, or both, are far from zero, we should filter G heavily.

Thus we can instead calculate our mask for G as
for all pixel positions x,y:
  if 0.715169*G(x,y)<4.0 AND 0.715169*G(x,y)<0.5* 0.212639*R(x,y) AND 0.715169*G(x,y)<0.5* 0.072192*B(x,y)
    mask(x,y)=1
  else
    mask(x,y)=0
  end
end A generalized version of the above method that applies the filtering on all three components, instead of just the G component, could be realized as follows:
for all pixel positions x,y:
  valR=R(x,y);
  valG=G(x,y);
  valB=B(x,y);
  num=1;
  (X, Y, Z)=calculateXYZ(R(x,y), G(x,y), B(x,y))
  pqY=PQ(Y)*A
  (u', v')=calculate_upvp(X, Y, Z)*B
  for all pixel positions x2, y2 in a neighborhood of x,y
    (X2, Y2, Z2)=calculateXYZ(R(x2,y2), G(x2,y2), B(x2,y2))
    pqY2=PQ(Y2)*A
    (u2', v2')=calculate_upvp(X2, Y2, Z2)*B
    if(abs(pqY2−pqY)<=1 AND abs(u2'−u)<=1 AND abs(v2'−v')<=1)
      valR=valR+R(x2,y2)
      valG=valG+G(x2,y2)
      valB=valB+B(x2,y2)
      num=num+1
    end
  end
  if num>=1
    Rblur(x,y)=valR/num
    Gblur(x,y)=valG/num
    Bblur(x,y)=valB/num
  else
    Rblur(x,y)=R(x,y)
    Gblur(x,y)=G(x,y)
    Bblur(x,y)=B(x,y)
  end
end The weights A and B could, for example, be set to 2047 and 511, respectively, or 511 and 127, respectively, or to values that are optimized for compression, e.g. gives the best BD-rate numbers after compressing with an HEVC encoder at different bitrates.

A "soft filtering" version of the above method can be realized as follows:
for all pixel positions x,y:
  valR=R(x,y);
  valG=G(x,y);
  valB=B(x,y);
  num=1;
  (X, Y, Z)=calculateXYZ(R(x,y), G(x,y), B(x,y))
  pqY=PQ(Y)*A
  (u', v')=calculate_upvp(X, Y, Z)*B
  for all pixel positions x2, y2 in a neighborhood of x,y
    (X2, Y2, Z2)=calculateXYZ(R(x2,y2), G(x2,y2), B(x2,y2))
    pqY2=PQ(Y2)*A
    (u2', v2')=calculate_upvp(X2, Y2, Z2)*B
    w=f(abs(pqY2−pqY), abs(u2'−u'), abs(v2'−v'))
      valR=valR+w*R(x2,y2)
      valG=valG+w*G(x2,y2)
      valB=valB+w*B(x2,y2)
      num=num+w
    end
  end
  if num>=1
    Rblur(x,y)=valR/num
    Gblur(x,y)=valG/num
    Bblur(x,y)=valB/num
  else
    Rblur(x,y)=R(x,y)
    Gblur(x,y)=G(x,y)
    Bblur(x,y)=B(x,y)
  end
end
f(a,b,c) is any function with the property that it is equal to, or close to, 1 when a, b and c are small and equal to, or close to, 0 when any one of a, b and c is large.

Non-limiting but illustrative examples of the function f(a,b,c) include min(a,b,c)/max(a,b,c) and min(a,b,c)/(max (a,b,c)+s), wherein s is small, typically positive value, such as 0.1.

For all of the above embodiments in which filtering is applied it is also possible to take into account the spatial distance between the pixel that will be filtered and the different pixels in the neighborhood, e.g. such that neighbors that are closer will have stronger influence than those further away.

The previous embodiments in this document refer to adjusting the pixels before encoding the video in order to handle the problematic areas. This is the preferred order of doing it since the original pixels are available. Moreover, by smoothening pixels before encoding, fewer bits are needed for encoding the video. In yet another embodiment the problem areas are instead estimated and adjusted after decoding the video. One way of doing this is to first calculate a first version of the reproduced RGB pixels from the decoded Y'Cb'Cr' pixels, including upsampling from 4:2:0 or 4:2:2 to 4:4:4. The instability coefficient is then calculated as $$C_i = ((\partial Y'/dG)^2 + (\partial Cb'/dG)^2 + (\partial Cr'/dG)^2) / ((\partial PQ(Y)/dG)^2 + (\partial u'/dG)^2 + (\partial v'/dG)^2)$$

In the equation above, Y', Cb', Cr' are the decoded pixel values and PQ(Y), u' and v' are calculated from the first version of the reproduced RGB pixels. A second and final version of the reproduced RGB pixels is then calculated according to any of the previous embodiments. With this approach, some of the problematic areas could be adjusted on the decoder side in a scenario where it would not be possible to adjust the problem on the encoding side.

It is also possible to weight the different components of the vectors when calculating the instability coefficient:

$$\text{instability coefficient} = C_i = \|(w1*\partial Y'/dG, w2*\partial Cr/dG, w3*\partial Cb'/dG)\|^2 / \|(w4*\partial PQ(Y)/dG, w5*\partial u'/dG, w6*\partial v'/dG)\|^2 = (w1^2*(\partial Y'/dG)^2 + w2^2*(\partial Cb'/dG)^2 + w3^2*(\partial Cr'/dG)^2) / (w4^2*(\partial PQ(Y)/dG)^2 + w5^2*(\partial u'/dG)^2 + w6^2*(\partial v'/dG)^2),$$

where w1 to w6 are positive weights. This makes it possible to weight luminance more than chrominance, and vice versa.

Another strategy that does not involve filtering is to identify the first case pixels and simply replace the green component value with a fixed value, such as zero. Here we have assumed that the green component is the "problematic" one, but the same goes for the red and blue, if they are the smallest component in a first case pixel. Replacing the smallest value with a fixed value will remove all the variability of the Y'Cb'Cr' components without having to investigate neighboring pixels, and without any expensive filtering. The "fixed" value can depend on the color. For instance, for a first case pixel of color (1000, 0.1, 100), one might want to use 0.5 as a fixed value, whereas for a first case pixel of color (100, 0.1, 10) one may use the value 0.05.

Note also, that unlike a prior art solution that simply avoids using colors close to the color gamut, the proposed method does not restrict the colors to be in a particular place in the color gamut. As an example, if we used the fixed value 0.0 for the green component in the first case pixel (1000, 0.1, 100), we get (1000, 0, 100), which is right on top of the edge of the color gamut. Such a saturated color is not possible with the prior art solution.

In an alternate embodiment, the smallest coefficient in a first case pixel is set to one of a set of fixed values. As an example, if the value is between 0 and 0.001, it may be set to 0, whereas if it is between 0.001 and 0.01, it may be set to 0.005, if it is between 0.01 and 0.1, it may be set to 0.05 etc. One may have a sufficient number of such fixed values so that the distance between them is smaller than what is noticeable by the human eye, to avoid banding issues. Thus the set of fixed values may differ from color to color; the color (1000, 0.1, 100) may have one set of fixed values, whereas the color (100, 0.1, 10) may have another, larger or smaller set of fixed values.

An embodiment can be described by the following steps:
1. One or more samples, i.e. pixels, are evaluated based on a criterion related to how visible differences are expected to be by the human visual system.
2. One or more components of the at least one sample, i.e. pixel, is modified based on the evaluation in step 1.

When the method is performed by, or in direct conjunction with, an encoder the following steps are preferably performed:
1. For at least one picture in a video sequence consisting of several pictures, one or more samples, i.e. pixels, are evaluated based on a criterion related to how visible differences are expected to be by the human visual system.
2. One or more components of at least one sample, i.e. pixel, is modified based on the evaluation in step 1.
3. The modified video sequence is encoded.

As an example, varying the green component of RGB= (1000, 0.1, 100) plus minus 0.05 changes the representation in Y'Cb'Cr' a lot so it should be filtered.

Varying the green component of RGB=(1000, 200, 100) plus minus 0.05 doesn't change the representation in Y'Cb'Cr' a single step.

In both cases the differences will not be visible by the human eye, but only in the first case may we want to go through the trouble of actually filtering.

In another embodiment, coding modes are optimized with respect to error in at least one of PQ(Y), u', or v', or any other counter parts related to human vision, i.e. luminance and chrominance based representation, at least for regions or blocks that have some samples, i.e. pixels, that are judged to be instable and thus be of risk for producing coding artifacts with very visible artifacts. This can happen both at the encoder side but also on the decoder side. Example of coding modes are in-loop filtering, such as sample adaptive offset (SAO) or adaptive loop filtering (ALF), but can also be for coding modes related to inter or intra prediction and residual coding.

The invocation of the embodiment for a decoder side can be signaled in one or several syntax element(s) on sequence level, such as sequence parameter set (SPS), picture level, such as picture parameter set (PPS), slice level or block level. The signaling can be represented in a supplemental enhancement information (SEI) message, such as for application in post-processing outside the coding loop, or be part of the normative signaling in a coded bitstream, such as for application inside the coding loop. When it is present it forces values in a certain range of pixel values for Y' or Cb' or Cr', or any other selected color components counter parts that are coded/decoded or a representation space that is intended for viewing, to one or several fixed value(s). The forcing can be implemented as a smoothing filter or simply a replacement with one or several fixed values.

The invocation of the embodiment and the range of pixel values can be specific for only one of the color components or apply to all. The range of pixel values and one or several fixed values can be specified in the decoding process for a standard or be part of a coded video bitstream. The application of a method can be part of normal clipping operations that typically occurs in motion compensated prediction, after addition of decoded residual and intra/inter prediction or after in-loop filtering. In normal clipping operation the lower bound or threshold is typically 0 and the higher bound 1023 for a 10 bit signal. In addition to the normal clipping here also a sort of clipping would be applied to a range of pixel such that they are replaced with a single value such that it results in a pleasantly looking signal in at least one of PQ(Y), u' or v', or any other counter parts related to human vision.

The application of the previous embodiments is especially important in areas that visually appear to be relatively flat or smooth. Since the artifacts in such regions are especially noticeable.

In most embodiments it has been described to do a modification of sample values in the green, red or blue color channel. However instead of doing the modification in that color space the modification could be applied for one or more of Y' or Cb' or Cr' or any other color space that is selected for coding.

Figure 20:
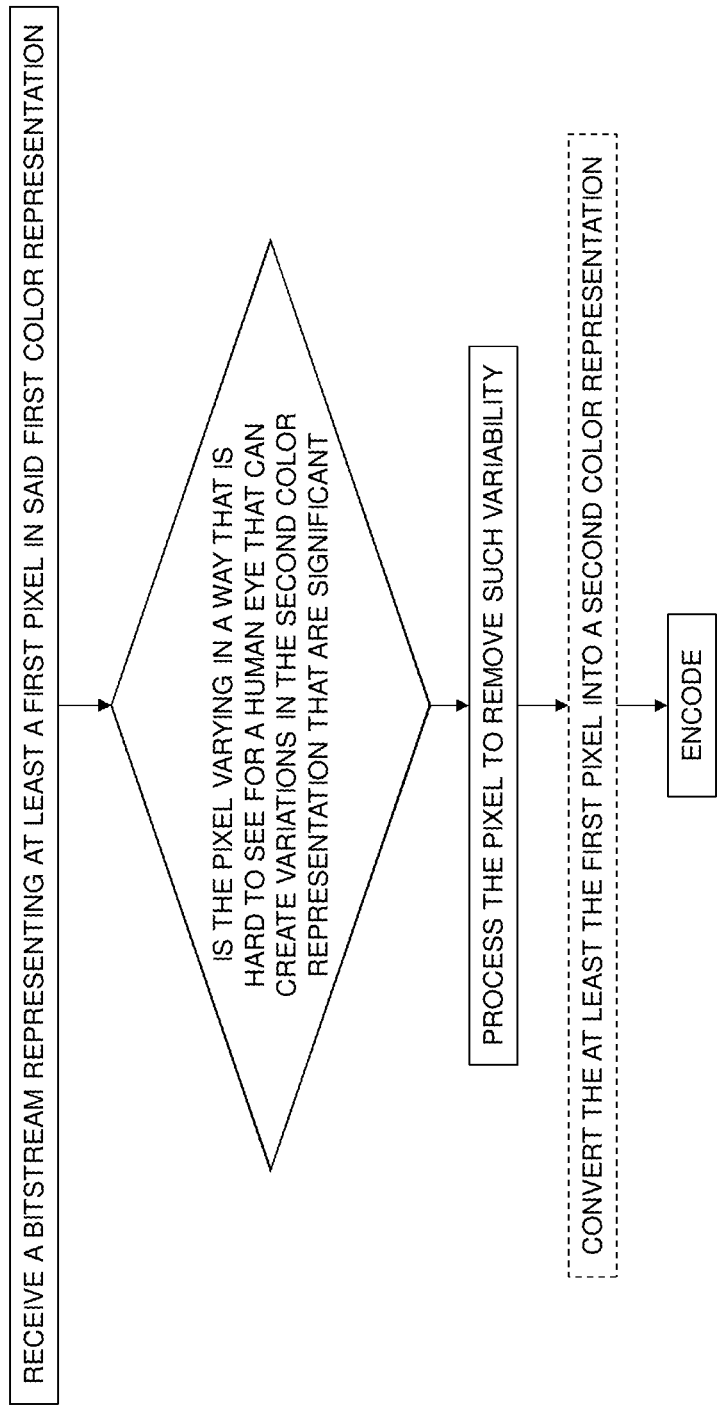
FIG. 20 is a flow chart illustrating a method according to one embodiment.

FIG. 20 illustrates a method according to an embodiment. The method comprises the steps of receiving a bitstream representing at least a first pixel in a first color representation, such as RGB. A next step investigates or determines whether the pixel is varying in a way that is hard to see for a human eye that can create variations in a second color representation, such as Y'Cb'Cr', that are significant. In such a case, the pixel is processed to remove such variability.

It should be noted that the step of converting at least the first pixel into the second color representation in FIG. 20 is optional.

A further aspect of the embodiments relates to a device for processing pixels in a picture of a video sequence comprising multiple pictures. The device is configured to identify a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The device is also configured to process the identified pixel by modifying a value of at least one color component of the pixel.

In an embodiment, the device is configured to identify a pixel in the picture having a value of a color component of the linear representation of the color that is smaller than a fourth threshold value and for which a ratio between the value of the color component and a value of another color component of the linear representation of the color is smaller than a fifth threshold value.

In an embodiment, the device is configured to identify a pixel in the picture having a value of a color component of the linear representation of the color that is smaller than a fourth threshold value and for which a value of at least one color component of the linear representation of the color is larger than a sixth threshold value.

In an embodiment, the device is configured to identify a pixel in the picture having the value of the color component of the linear representation of the color that is smaller than the fourth threshold value and for which the value of the at least one other color component of the linear representation of the color is equal to or larger than a factor times the value of the color component of the linear representation of the color, wherein the factor is larger than one.

In an embodiment, the device is configured to identify a pixel to be processed in the picture for which a variation in the linear representation, such as RGB or XYZ, of the color that is smaller than the first threshold value results in a variation in a Y'Cb'Cr' representation of the color that is larger than the second threshold value. The variation in the linear representation of the color also results in a variation in a PQ(Y)u'v' or PQ(Y)xy representation of the color that is smaller than the third threshold value.

In a particular embodiment, the linear representation of the color is a RGB representation of the color. In such a case, the device is configured to calculate, for the pixel, an instability coefficient based on the derivative of a luma component Y', a chroma component Cb' and a chroma component Cr' with respect to at least one color component in the RGB representation of the color and the derivative of a luminance based component PQ(Y) and chrominance based components u'v' or xy with respect to the at least one color component in the RGB representation. The device is also configured to select the pixel to be processed if the instability coefficient is higher than seventh threshold value.

In a particular embodiment, the device is configured to calculate the instability coefficient $C_i$ based on:

$$\frac{\left\| w_1 \frac{\partial Y'}{dA}, w_2 \frac{\partial Cb'}{dA}, w_3 \frac{\partial Cr'}{dA} \right\|^2}{\left\| w_4 \frac{\partial PQ(Y)}{dA}, w_5 \frac{\partial u'}{dA}, w_6 \frac{\partial v'}{dA} \right\|^2} = \frac{w_1^2 \frac{\partial Y'^2}{dA} + w_2^2 \frac{\partial Cb'^2}{dA} + w_3^2 \frac{\partial Cr'^2}{dA}}{w_4^2 \frac{\partial PQ(Y)^2}{dA} + w_5^2 \frac{\partial u'^2}{dA} + w_6^2 \frac{\partial v'^2}{dA}}$$

or $$\frac{\left\| w_1 \frac{\partial Y'}{dA}, w_2 \frac{\partial Cb'}{dA}, w_3 \frac{\partial Cr'}{dA} \right\|^2}{\left\| w_4 \frac{\partial PQ(Y)}{dA}, w_5 \frac{\partial x}{dA}, w_6 \frac{\partial y}{dA} \right\|^2} = \frac{w_1^2 \frac{\partial Y'^2}{dA} + w_2^2 \frac{\partial Cb'^2}{dA} + w_3^2 \frac{\partial Cr'^2}{dA}}{w_4^2 \frac{\partial PQ(Y)^2}{dA} + w_5^2 \frac{\partial x^2}{dA} + w_6^2 \frac{\partial y^2}{dA}}$$

wherein $w_1 \ldots w_6$ are non-zero weights or absent and A represents one of a red color component R, a green color component G and a blue color component B in the RGB representation.

In an embodiment, the device is configured to replace an original value of at least one color component of the pixel with a modified value of the at least one color component if the instability coefficient is higher than the seventh threshold value. The device is also configured to replace the original value of the at least one color component with a linear combination of the original value of the at least one color component and the modified value of the at least one color component if the instability coefficient is equal to or smaller than the seventh threshold value but is equal to or larger than an eighth threshold value. The device is further configured to keep the original value of the at least one color component if the instability coefficient is smaller than the eighth threshold value.

In an embodiment, the device is configured to process the identified pixel by modifying a value of at least one color component of the linear representation of the color.

In another embodiment, the device is configured to replace the value of the at least one color component of the pixel with a weighted average of values of the at least one color component of neighboring pixels in the picture.

In a particular embodiment, the device is configured to identify neighboring pixels in the picture for which a variation in a linear representation of a color of the neighboring pixel that is smaller than the first threshold value results in a variation in a non-linear representation of the color of the neighboring pixel that is larger than the second threshold value. The variation in the linear representation of the color of the neighboring pixel also results in a variation in a luminance and chrominance based representation of the color of the neighboring pixels that is smaller than the third threshold value. The device is also configured to replace the value of the at least one color component of the pixel with a weighted average of values of the at least one color component of the identified neighboring pixels in the picture.

In another particular embodiment, the device is configured to identify neighboring pixels in the picture for which an absolute difference between a value of a luminance based component of the pixel and a value of a luminance based component of the neighboring pixel is equal to or smaller than a ninth threshold value. A respective absolute difference between respective values of chrominance based components of the pixel and respective values of chrominance based components of the neighboring pixel is equal to or smaller than a tenth threshold value. The device is also configured to replace the value of the at least one color component of the pixel with a weighted average of values of the at least one color component of the identified neighboring pixels in the picture.

In an embodiment, the device is configured to set the value of the at least one color component to a fixed value.

In another embodiment, the device is configured to filter the value of the at least one color component of the pixel.

In a particular embodiment, the device is configured to filter the value of the at least one color component of the pixel with a filter having filter coefficients that are determined based on the instability coefficient.

Figure 21:
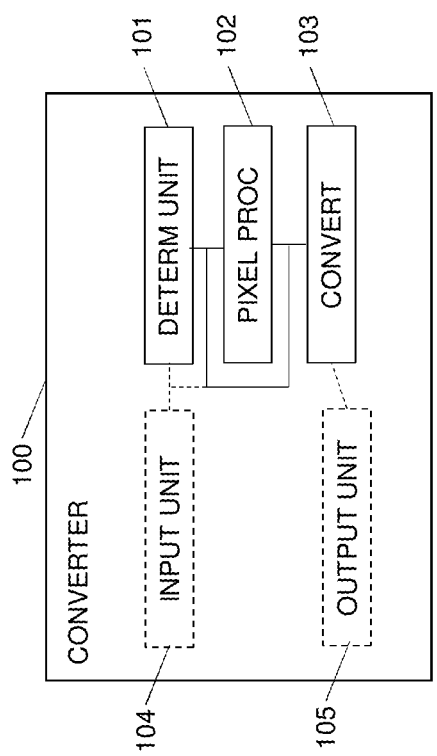
FIG. 21 is a schematic illustration of hardware implementations of a device or converter according to the embodiments.

FIG. 21 illustrates a particular hardware implementation of a converter 100 according to an embodiment. In an embodiment, the converter 100 comprises a determining unit 101 configured to determine if varying the pixel in a way that is hard to see for a human eye, also referred to as visible, can create variations in a second color representation that are significant. Such a determination may be done according to any of the embodiments described herein. When it is determined that the pixel can be varied in a way that is hard to see for the human eye yet can create variations in the second color representation that are significant, the pixel is processed by a pixel processor 102 of the converter 100 to remove potential such variability. The converter 100 optionally comprises a converting unit 103 configured to color convert the pixel to the second color representation. The actual converting to the second color representation can be performed later in the process.

In an embodiment, the converter 100 also comprises an input unit 104 configured to receive the bitstream representing at least a first pixel in the first color representation and an output unit 105 configured to output a bitstream, which is color converted, to an encoder.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 could be in the form of a general output unit, in particular in the case of a wired connection to external devices. Alternatively, the output unit 105 could be in the form of a transmitter or transceiver, in particular in the case or a wireless connection to external devices The input unit 104 is preferably connected to the determining unit 101 and the determining unit 101 is preferably connected to a pixel processor 102, which is further connected to the converting unit 103 and then to the output unit 105. The output unit 105 may be connected to a video encoder (not illustrated). The video encoder is configured to compress or encode the pixel.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 22:
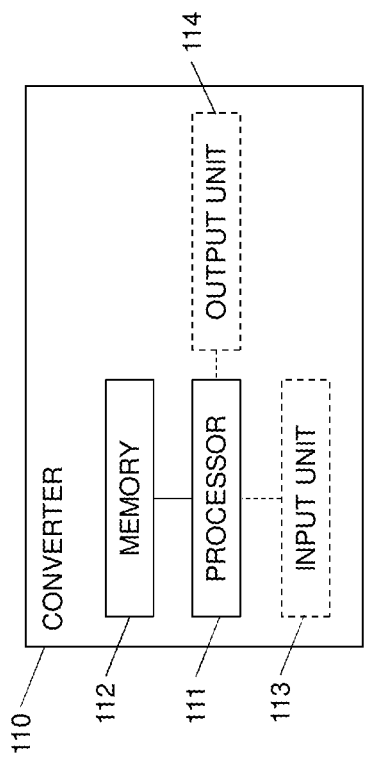
FIG. 22 is a schematic illustration of an implementation of a device or converter according to the embodiments with a processor and a memory.

In an embodiment, see FIG. 22, the device for processing a pixel is represented as a converter 110, which comprises a processor 111 and a memory 112 comprising instructions executable by the processor 111. The processor 111 is operative to identify the pixel to be processed. The processor 111 is also operative to process the identified pixel.

In another embodiment, a device for encoding a pixel in a picture of a video sequence comprising multiple pictures is represented as a converter 110, which comprises a processor 111 and a memory 112 comprising instructions executable by the processor 111. The processor 111 is operative to identify a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The processor 111 is also operative to process the identified pixel by modifying a value of at least one color component in the linear representation of the color. The processor 111 is further operative to convert the linear representation of the color into a non-linear representation of the color of the pixel. The processor 111 is additionally operative to encode the non-linear representation of the color.

In a particular example, the converter 110, see FIG. 22, comprises a processor 111 and a memory 112 comprising instructions executable by the processor 111. The processor 111 is operative to determine if varying the pixel in a way that is hard to see for a human eye, also referred to as visible, can create variations in the second color representation that are significant. Such a determination may be done according to any of the embodiments described herein. When it is determined that the pixel can be varied in a way that is hard to see for the human eye yet can create variations in the second color representation that are significant, the processor 111 is configured to process the pixel to remove potential such variability and then to color convert the pixel.

In an embodiment, the device 110 also comprises an input unit 113 configured to receive the bitstream. In such a case, the processor 111 is operative to receive the bitstream from the input unit 113.

In an embodiment, the device 110 also comprises an output unit 114 configured to output the bitstream representing the color converted pixel.

In a particular embodiment, the processor 111 is operative, when executing the instructions stored in the memory 112 to perform the above described operations. The processor 111 is thereby interconnected to the memory 112 to enable normal software execution.

Figure 23:
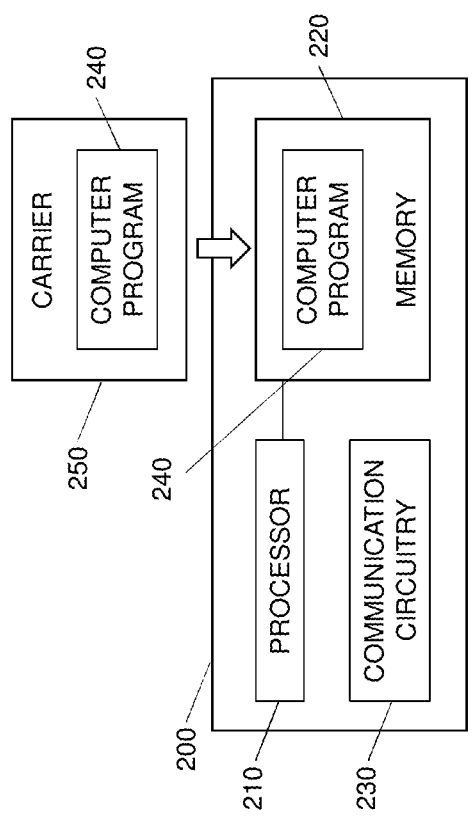
FIG. 23 is a schematic illustration of a user equipment according to an embodiment.

FIG. 23 is a schematic block diagram illustrating an example of a user equipment (UE) 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of video data and converted video data, optionally encoded converted video data.

The user equipment 200 can be any device or apparatus that can receive and process video data. For instance, the user equipment 200 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to perform the determination and processing according to the embodiments.

In another embodiment, the computer program 240 comprises instructions, which when executed by a processor 210, cause the processor 210 to identify a pixel to be processed in a picture of a video sequence comprising multiple pictures for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The processor 210 is also caused to process the identified pixel by modifying a value of at least one color component of the pixel.

In a particular embodiment, the computer program 240 comprises instructions, which when executed by the processor 210, cause the processor 210 to process the identified pixel by modifying a value of at least one color component in the linear representation of the color. The processor 210 is also caused to convert the linear representation of the color into a non-linear representation of the color of the pixel. The processor 210 is further caused to encode the non-linear representation of the color.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 in FIG. 23, for execution by the processor 210 thereof.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 24.

Figure 24:
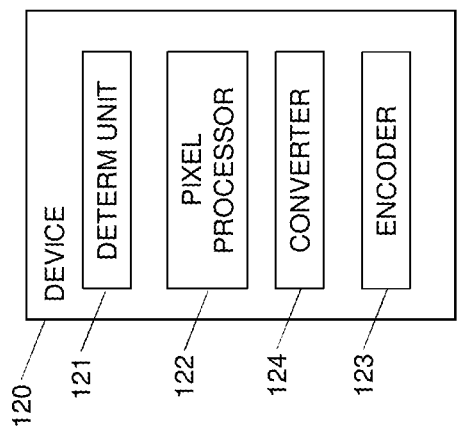
FIG. 24 is a schematic illustration of an implementation of a device according to the embodiments with function modules.

In an embodiment, FIG. 24 illustrates a device 120 for processing a pixel in a picture of a video sequence comprising multiple pictures. The device 120 comprises a determining unit 121 for identifying a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The device 120 also comprises a pixel processor 122 for processing the identified pixel by modifying a value of at least one color component of the pixel.

In this embodiment, the encoder 103 and converter 104 shown in FIG. 24 are optional and may be omitted.

In another embodiment, FIG. 24 illustrates a device 120 for encoding a pixel in a picture of a video sequence comprising multiple pictures. The device 120 comprises a determining unit 121 for identifying a pixel to be processed in the picture for which a variation in a linear representation of a color of the pixel that is smaller than a first threshold value results in a variation in a non-linear representation of the color that is larger than a second threshold value. The variation in the linear representation of the color also results in a variation in a luminance and chrominance based representation of the color that is smaller than a third threshold value. The device 120 also comprises a pixel processor 122 for processing the identified pixel by modifying a value of at least one color component in the linear representation of the color. The device 120 further comprises a converter 124 for converting the linear representation of the color into a non-linear representation of the color of the pixel. The device 120 additionally comprises an encoder 123 for encoding the non-linear representation of the color.

In a further embodiment, FIG. 24 is a schematic block diagram of a device 120 with function modules. The device 120 comprises a determining unit 121 for determining if varying the pixel in a way that is hard to see for a human eye, also referred to as visible, can create variations in the second color representation that are significant. The device 120 also comprises a pixel processor 122 for processing the pixel to remove potential such variability and a may also comprise a converter for color converting the pixel to the second color representation. The device 120 further comprises a video encoder 123 for encoding the color converted bitstream possibly using the pixel processed to remove variability.

The embodiments also relate to a user equipment comprising a device according to any of the embodiments, such as disclosed in any of FIG. 21, 22 or 24. The user equipment is selected from a group consisting of a computer, a laptop, a smart phone, a tablet and a set-top box.

A further aspect of the embodiments relates to a signal representing an encoded version of a pixel in a picture of a video sequence comprising multiple pictures. The encoded version comprises an encoded non-linear representation of a color of the pixel according to any of the embodiments.

In a particular embodiment, the signal is one of an electronic signal, an optical signal, an electromagnetic signal, a magnetic signal, an electric signal, a radio signal and a microwave signal.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 25:
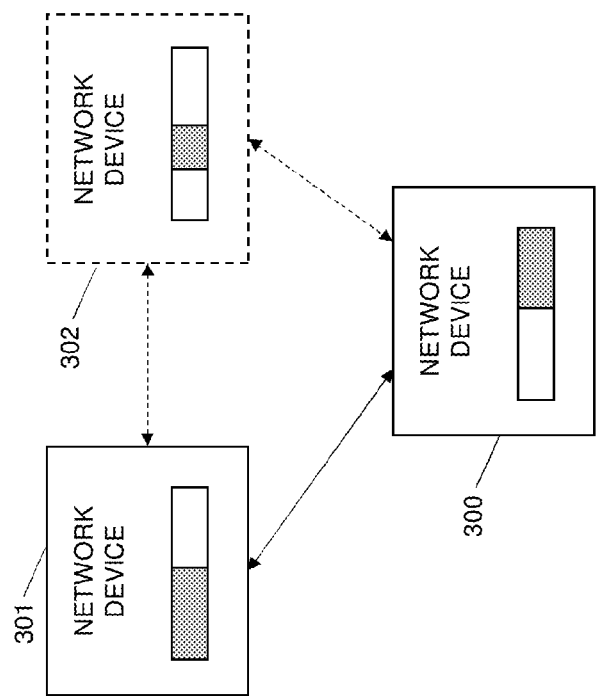
FIG. 25 schematically illustrate a distributed implementation of the embodiments among multiple network devices.

FIG. 25 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 26:
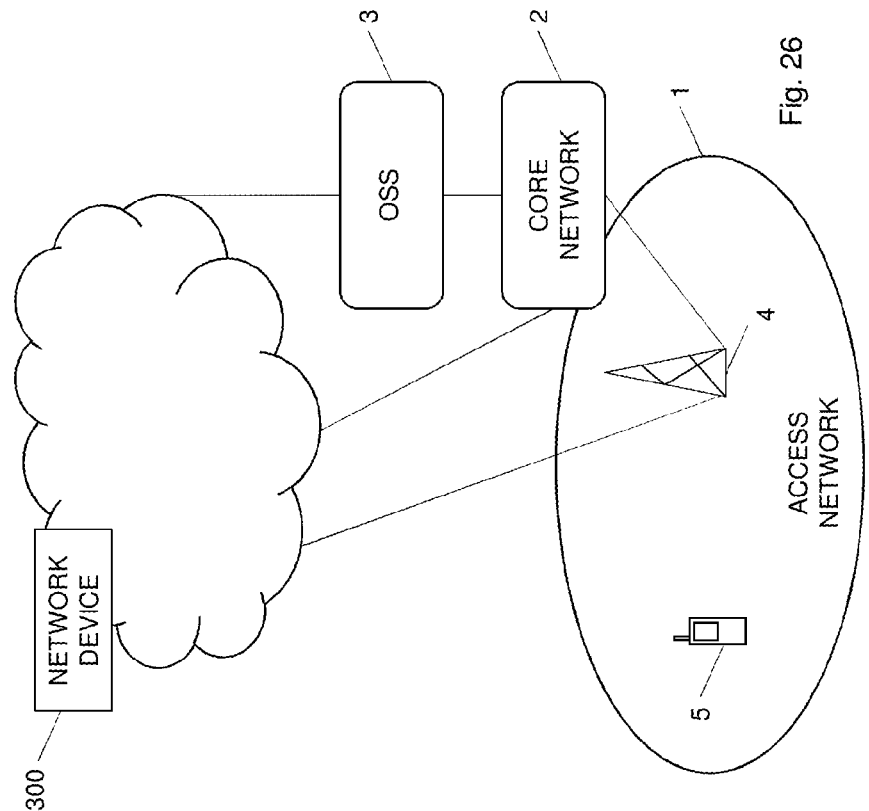
FIG. 26 is a schematic illustration of an example of a wireless communication system with one or more cloud-based network devices according to an embodiment.

FIG. 26 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and encoder or decoder systems and any feature from a particular figure disclosed in connection with other features may be applicable to any other figure and or combined with different features.

Annex A

The present Annex A comprises a description of the Ajusty method that can be used according to the embodiments in order to derive a non-linear luma component value in the second color space.

A combination of a highly non-linear transfer function, 4:2:0 or 4:2:2 subsampling and non-constant luminance ordering gives rise to severe artifacts in saturated colors. An example is described in Annex B, where changes between two colors of similar luminance can result in a reconstructed image with very different luminances.

In a digital video signal, each component of a sample, i.e. pixel, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma $\gamma$ is the exponent value. This is typically 2.4 (but can also be other values): $Y = V^\gamma$.

Using a gamma function works well for low luminance signals but when the luminance goes above 100 nits (cd/m$^2$) the gamma function is not well aligned with the contrast sensitivity of the human visual system. Therefore transfer functions that are more non-linear are defined, e.g.:

$$Y = L_p \left( \frac{\max\left[\left(V^{\frac{1}{m}} - c_1\right), 0\right]}{c_2 - c_3 V^{\frac{1}{m}}} \right)^{\frac{1}{n}} \quad \text{(equation A1)}$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \frac{cd}{m^2}$$

This transfer function is more non-linear than the gamma function in the sense that the maximum value of its first derivative over the range from 0 to 1 is larger than that of the gamma function.

Chroma subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e. colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e. apply the transfer function after conversion to the CIE1931 XYZ color space. However, such a solution is not aligned with common practice within the broadcasting industry and might in some scenarios be difficult and expensive to realize.

A typical compression chain is described below. The incoming linear light pixel (R, G, B) ranging from 0 to 10,000 is first fed to the transfer function, which results in a new pixel (R', G', B') between 0 and 1. After this, the pixel undergoes color transform resulting in Y'Cb'Cr'. Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y' Cb' Cr') generated from the interpolated colors is not so different from the original. Ideally the difference would be so small that it is not noticeable.

Basically it emanates to realizing that the Cb' and Cr' components are false, and then make also the Y' component false so that the (Y' Cb' Cr') are closer to the true colors. In other words, by introducing an error in Y' we can compensate for the errors already existing in Cb' and Cr' to come closer to the real pixel. It could be determined that the Cb' and Cr' components are false by comparing Cb'-Cb and Cr-Cr with a threshold by e.g. comparing the Cb' that you get from first subsampling chroma (4:2:0) then upsampling (to 4:4:4).

According to a first aspect an Ajusty method is provided. The method can be performed in an encoder or in a pre-process to the encoder. In the method, when it is determined that the Cb' and/or Cr' components include errors, a corrected Y' component is derived to compensate for the errors in the Cb' and/or the Cr' components.

According to a second aspect a unit, such as a pre-processor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The corrected Y' component can derived according to different embodiments as described below. Hence the corrected Y' component, Cb' and Cr' are then compressed resulting in that the image or video is perceived with a higher quality.

By changing the Y' component, i.e. deriving a corrected Y' component, we can compensate the resulting luminance value. The eye is much more sensitive to luminance changes than to chrominance changes, so the first rule must always be to make sure that the luminance does not deviate too much from the original value.

As described above, the non-linear luminance Y' is adjusted prior to compression so that the linear luminance Y of the pixel is closer to its correct value. This is further described below.

Assume a picture where the left part of the screen, e.g. pixels 0 to 96, has the value (2142, 0, 138) and that the right part, e.g. pixels 97 to 1920, has the value (2142, 4, 138). With a conventional processing chain we would get the results in Table A1.

TABLE A1

Data for the "worst" color for 4:2:0 subsampling

| Pixel no. 97 | RGB value | Y value | Y diff | relative error | Barten steps |
|---|---|---|---|---|---|
| original | 2142 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 3993.733 2.4265 263.6030 | 1066.4311 | 492.8320 | 85.9192% | 195.2710 |

*This indicates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation A2)}$$

This Y component is the luminance that the eye is most sensitive to. It should not be confused with the Y' component mentioned above, which depends nonlinearly on R, G and B.

As can be seen in Table A1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable.

If we look at Table A2, we can see what happens.

TABLE A2

Pixel 97 is very different before and after color subsampling

| 4:4:4 10 bits | 94 | 95 | 96 | 97 | 98 | 99 |
|---|---|---|---|---|---|---|
| Linear | 2142 | 2142 | 2142 | 2142 | 2142 | 2142 |
| RGB | 0 | 0 | 0 | 4 | 4 | 4 |
| in | 138 | 138 | 138 | 138 | 138 | 138 |
| Y'Cb'Cr' | 284 | 284 | 284 | 422 | 422 | 422 |

TABLE A2-continued

Pixel 97 is very different before and after color subsampling

| 4:4:4 10 bits | 94 | 95 | 96 | 97 | 98 | 99 |
|---|---|---|---|---|---|---|
| 4:2:0 | 650 | | 641 | | 575 | |
| 10 bits | 867 | | 855 | | 771 | |
| Y'Cb'Cr' | 284 | 284 | 284 | 422 | 422 | 422 |
| after | 650 | 650 | 641 | 607 | 575 | 571 |
| upsampling | 867 | 866 | 855 | 812 | 771 | 766 |
| Linear | 2151.71 | 2119.42 | 1794.94 | 3993.73 | 2142.66 | 1986.71 |
| RGB | 0 | 0 | 0.0018 | 2.4265 | 3.9750 | 4.2102 |
| out | 138.2278 | 138.2278 | 114.8210 | 263.6030 | 138.2966 | 127.3837 |

If we look at the Cb' component, it has the value 607, which is about halfway between 650, before the discontinuity, i.e. pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table A3 we show the result.

TABLE A3

Pixel 97 is much more similar before and after color subsampling

| 4:4:4 10 bits | 94 | 95 | 96 | 97 | 98 | 99 |
|---|---|---|---|---|---|---|
| Linear | 2142 | 2142 | 2142 | 2142 | 2142 | 2142 |
| RGB | 0 | 0 | 0 | 4 | 4 | 4 |
| in | 138 | 138 | 138 | 138 | 138 | 138 |
| Y'Cb'Cr' | 284 | 284 | 284 | 363 | 422 | 422 |
| 4:2:0 | 650 | | 641 | | 575 | |
| 10 bits | 867 | | 855 | | 771 | |
| Y'Cb'Cr' | 284 | 284 | 284 | 363 | 422 | 422 |
| after | 650 | 650 | 641 | 607 | 575 | 571 |
| upsampling | 867 | 866 | 855 | 812 | 771 | 766 |
| Linear | 2151.71 | 2119.42 | 1794.94 | 2145.11 | 2142.66 | 1986.71 |
| RGB | 0 | 0 | 0.0018 | 0.7008 | 3.9750 | 4.2102 |
| out | 138.2278 | 138.2278 | 114.8210 | 138.0825 | 138.2966 | 127.3837 |

We can now see that the new color is much more similar to its correct value. The green component has gone in the wrong direction, but only by 1.72 cd/m², but at the same time the red component has almost halved to its correct value, a movement of 1849 cd/m², and the blue component has changed in a similar fashion. In Table A4 we show what happens to the luminance.

TABLE A4

Data for the "worst" color for 4:2:0 subsampling after correction

| Pixel no. 97 | RGB value | Y value | Y diff | relative error | Barten steps |
|---|---|---|---|---|---|
| original | 212<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0* | 2145.11<br>0.7008<br>138.0825 | 572.1852 | 1.4139 | 0.2465% | 0.5602 |

*This indicates values obtained by upsampling the subsampled color in 4:2:0 format As is seen in Table A4, we get a much smaller error in the luminance Y. The relative error is 0.2465%, which is equivalent to 0.5602 Barten steps, i.e. not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m² instead of 3.9750 cd/m² but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e. largest error, is minimized.

Another variant is to use two or more neighboring values of Cb' and Cr' and use them directly to calculate the range of possible Cb' and Cr' values.

Figure 27:
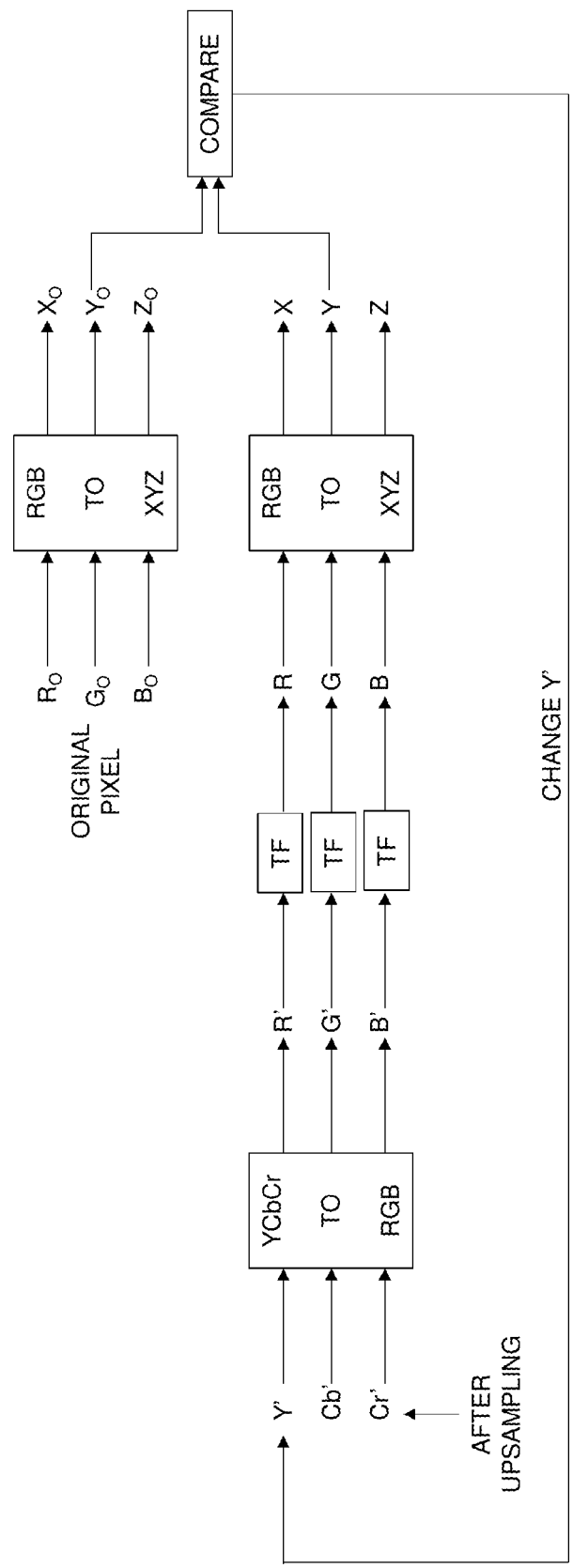
FIG. 27 illustrates an embodiment of deriving the corrected Y'.

There are several ways to find the best value for Y', we will go through a number of them. One way is shown in FIG. 27.

First we need to find the value $Y_O$ to optimize towards. The original pixel $R_O$, $G_O$, $B_O$ is transformed from RGB to XYZ as mentioned above. This results in $X_O$, $Y_O$, $Z_O$, of which we are only interested in $Y_O$. In fact, we do not need to calculate $X_O$ and $Z_O$. This $Y_O$ is the original luminance in linear light, and it is this that the eye is sensitive to. In our test case $Y_O$ is equal to 573.5991, see Table A1.

Second, we take our existing Y' value, together with the Cb' and Cr' values. In the case above, we would feed in (422, 607, 812), see Table A2. Now we would do a color transform from Y'Cb'Cr' to R'G'B'. This is done using $$R' = Y' + 1.47460 \times Cr'$$

$$G' = Y' - 0.16455 \times Cb' - 0.57135 \times Cr'$$

$$B' = Y' + 1.88140 \times Cb'. \quad \text{(equation A3)}$$

Next we invoke the transfer function. In this case we use the PQ-EOTF, which can be implemented using the following Matlab code, for instance:
function L=pq_eotf(c)
%%%
%%% c goes from 0.0 to 1.0%
%% L is output luminance in nits
%%%
c1=0.8359375;
c2=18.8515625;
c3=18.6875;
n=0.1593017578125;
m=78.84375;
c=max(c,0);
c=min(c,1);
L=10000*((max(c.^(1/m)-c1,0)./(c2-c3*c.^(1/m))).^(1/n));

The result is the color (R, G, B) in linear light. Now we convert this to XYZ as mentioned above, or really, we only need to calculate Y. This Y is the linear luminance of the pixel, and it is this luminance that we want to make as close as possible to $Y_O$. In our test case, Y starts out being 1066.4311, see Table A1.

Now we compare Y and $Y_O$. If Y is bigger than $Y_O$, we reduce our Y' value from 422 to something smaller. For instance, we can take one step and try 421. Then the entire calculation is carried out again, generating a new Y value. This is again compared to $Y_O$, and if it is still too big, we reduce Y' further. Finally, we will reach 363 and the resulting Y value, i.e. 572.1852 is now smaller than $Y_O$, i.e. 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_O$, we should search in the interval [0, 512]. If the Y-value is smaller than $Y_O$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024)=10$ steps are sufficient.

Yet another way to calculate the best value is to see FIG. 27 as an optimization problem and minimize the error $E=(Y-Y_O)^2$ with respect to Y'. This can be done by gradient descent, by calculating the gradient of E with respect to Y', i.e. dE/dY', and update Y' a small amount in the opposite direction of the gradient: $Y'_{n+1}=Y'_n - \alpha \times dE/dY'$, where α is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y':

X, $Y_O$ and Z are converted with a XYZ to RGB conversion to produce new values R1, G1 and B1

R1, G1 and B1 are converted with an inverse transfer function to produce R1', G1' and B1'.

R1', G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Looking at the bottom row in FIG. 27, the first step of processing is $$R' = Y' + 1.47460 \times Cr'$$

$$G' = Y' - 0.16455 \times Cb' - 0.57135 \times Cr'$$

$$B' = Y' + 1.88140 \times Cb'. \quad \text{(equation A3)}$$

But since Cr' and Cb' are fixed, they are interpolated, not sent, we can replace everything to the right of Y' with a constant $$R' = Y' + c1$$

$$G' = Y' + c2$$

$$B' = Y' + c3$$

The next step is taking the transfer function of the color components:

$$R = \text{TF}(R')$$

$$G = \text{TF}(G')$$

$$B = \text{TF}(B')$$

which then becomes $$R = \text{TF}(Y' + c1)$$

$$G = \text{TF}(Y' + c2)$$

$$B = \text{TF}(Y' + c3)$$

The last step of the processing is going from RGB to XYZ. This is done using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation A2)}$$

of this we are only interested in the Y component, so we use $$Y=0.262700 \times R+0.677998 \times G+0.059302 \times B.$$

Inserting the previous equations into this gives $$Y=0.262700 \times TF(Y'+c1)+0.677998 \times TF(Y'+c2)+0.059302 \times TF(Y'+c3),$$

or shortened to $$Y=f(Y')$$

We want the output value Y of this equation to match the original $Y_O$. Since the Y depends on Y' in three different places in a nonlinear way, there seems to be no easy way to invert the function so that we can get $$Y'=f^{-1}(Y).$$

However, it is possible to linearize the nonlinear TF(x)~kx+m. Doing this in the three different places gives $$Y \sim k1 \times Y'+m1+k2 \times Y'+m2+k3 \times Y'+m3$$

which is equivalent to $$Y \sim (k1+k2k3) \times Y'+(m1+m2+m3).$$

This can be inverted to $$Y' \sim Y'k=(Y_O-(m1+m2+m3))/(k1+k2+k3).$$

Thus it is likely that Y'k will produce a value Yk closer to $Y_O$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_O$ value. It may be sufficient to just use a few iterations or even one iteration. The corrected Y value resulting from a single iteration will most likely be much better than not correcting at all.

Figures 28, 29:
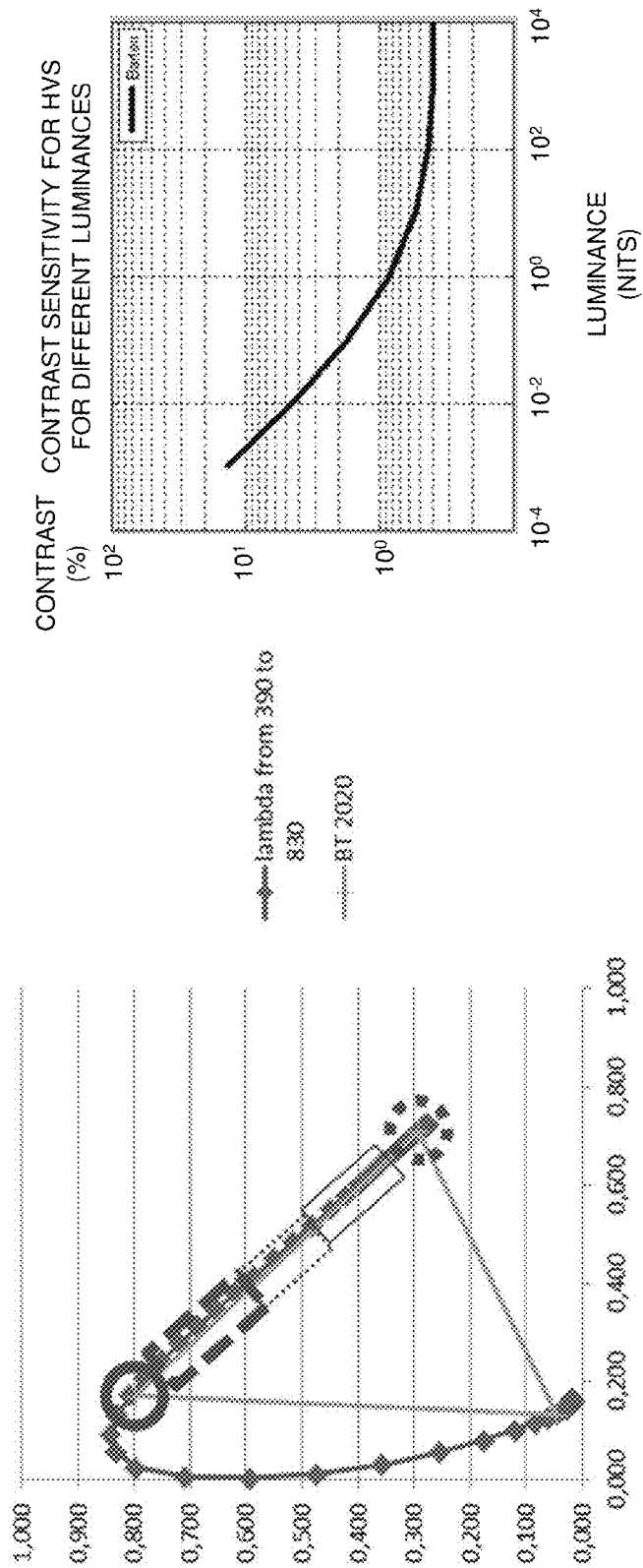
FIG. 28 is a diagram illustrating that there can be different linearizations in different color areas.
FIG. 29 illustrates Barten's curve for contrast sensitivity.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 28.

Thus, there can be different linearizations in different areas. If the color is inside the circle with a solid line, we are close to the green primary and we can use one linearization. If we are further along towards the red primary, i.e. inside the dashed box, we can use a second linearization. If we are close to the edge of the gamut and roughly half way between the red and the green primary, i.e. inside the dotted box, a third linearization can be used. If we are even closer to the red primary, i.e. inside the box with a solid line, a fourth linearization can be used. If we are inside the dotted circle, i.e. close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to 10 bits. We then need $2^{10} \times 2^{10} \times 2^{10}$ different values in our look-up table. That is equivalent to $2^{30}$ values. If each value is two bytes, this means $2^{31}$ bytes, or 2 Gb. That is big but maybe not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$$Y'=(LUT(Cb'6 \text{ bit},Cr'6 \text{ bit},Y6 \text{ bit})+(LUT(Cb'6 \text{ bit}+1, Cr'6 \text{ bit},Y6 \text{ bit}))/2$$

Interpolating between more than two values is also possible.

In an embodiment, a look-up table is used for deriving the value of Y'. In one version the look-up table contains every possible value of $Y_O$, Cb' and Cr'. For 10 bit video that will result in 1024×1024×1024 entries and in some applications this size is acceptable. In another version the look-up table (LUT) is pruned, for example through rounding one or more of $Y_O$, Cb' and Cr', e.g. to 8 bits. If a pruned look-up table is used the algorithm can be extended with a refinement step that finds the best Y' starting from the Y' that was retrieved from the LUT. In a version the LUT is only used when the Cb' value and/or the Cr' value is such that Y' can become too different from $Y_O$, i.e. when the initially calculated Y' gives a linear Y value that is too different from $Y_O$, and thereby the size of the LUT can be substantially reduced since many values of Cb' and Cr' will not cause any problems.

In an embodiment, a function of $Y_O$, Cb' and Cr', e.g. a linear combination, polynomial function, exponential function, logarithmic function, trigonometric function, etc., is used for deriving Y'. The function can be defined such that for any value of $Y_O$, Cb' and Cr' the difference between Y and $Y_O$ is below a certain threshold or the difference between the derived Y' and the optimal Y' is below a certain threshold.

In an embodiment several different functions of $Y_O$, Cb' and Cr' are defined for deriving Y'. The selection of which function to use is based on the value of $Y_O$, Cb' and Cr'.

For each embodiment described herein it could be the case that the method for deriving Y' is only invoked if the difference between Y' and $Y_O$ is above a certain threshold to begin with.

Annex B

This Annex B investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30 Barten steps is possible. For P3 content in a BT.2020 container, an error of 40 Barten steps is possible.

1 Introduction

It has been noted that small changes in color can introduce surprisingly large artifacts when 4:2:0 subsampling is used, even if no compression is happening.

1.1 Cross-Check Discrepancies

This investigation started as a cross-check of M35255 [1], trying to replicate the results on slide 13, reprinted in Table B1 below. The results are from a test image where the left part of the image up to pixel 95 has the color (3000, 0, 100) and the right part, pixel 96 and forward, has the color (3000, 4, 100).

TABLE B1

| | values of M35255 | | | | | |
|---|---|---|---|---|---|---|
| 4:2:0 10bits | 94 | 95 | 96 | 97 | 98 | 99 |
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| | 650 | 650 | 640 | 640 | 570 | 570 |
| | 882 | 882 | 870 | 870 | 787 | 787 |
| implied | 258 | 258 | 401 | 404 | 404 | 404 |
| YCbCr | 650 | 649 | 642 | 604 | 570 | 566 |
| | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (N14548, [2]) we got the result shown in Table B2. For downsampling, the filters described in Section 2.4.7 of [2] was followed (2 and 3 taps) and for upsampling Section 2.4.8 of [2] was followed (4 tap filters).

TABLE B2

| | values when trying to crosscheck | | | | | |
|---|---|---|---|---|---|---|
| 4:4:4 10 bits | 94 | 95 | 96 | 97 | 98 | 99 |
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 | | 580 | | 570 | |
| | 882 | | 799 | | 787 | |
| YCbCr | 258 | 258 | 404 | 404 | 404 | 404 |
| after | 650 | 616 | 580 | 571 | 570 | 569 |
| upsampling | 882 | 841 | 799 | 788 | 787 | 786 |
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table B3.

TABLE B3

| | values when moving the discontinuity | | | | | |
|---|---|---|---|---|---|---|
| 4:4:4 10 bits | 94 | 95 | 96 | 97 | 98 | 99 |
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 | | 640 | | 570 | |
| | 882 | | 870 | | 787 | |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table B3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in M35255 [1]. To confirm that the newer version of HDRtools (revision 573) is correct we have independently implemented the processing chain in Matlab and we get the same results as in Table B3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ) This affects the end result. As an example a float of 3007.9 will be converted to 3006.0, even though 3008.0 is a much closer value. To get a match we made the Matlab code emulate the floor( )-type conversion in the current revision of HDRtools (revision 587 of [3]).

1.3 Color Outliers

Note that even if pixel 96 is no longer an extreme outlier, pixel 97 is still quite far from correct: (5860, 2.58, 199) instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input EXR image and the output EXR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in M35255 [1].

Running this program gave the answer that having the color (2142, 0, 138) in the left part and (2142, 4, 138) in the right part gives the largest visible error, as shown in Table B4. The optimization software that looks for the "worst" error is not guaranteed to find the global maximum, hence even worse positions in the color gamut may exist.

TABLE B4 data for the "worst" color for 4:2:0 subsampling

| pixel 97 | RGB value | Y value | Y diff | relative error | Barten steps |
|---|---|---|---|---|---|
| original | 2142 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0 | 3993.7333 2.4265 263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

As can be seen in Table B4, the relative error for RGB 4:4:4 is 0.0304%. To put that in perspective, we compared that with Barten's curve, see FIG. 29 illustrating Barten's curve for contrast sensitivity. A contrast below the curve is not noticeable. Table B5 shows the values used for plotting the curve in FIG. 29.

TABLE B5 values used for plotting the Barten's curve

| Luminance in cd/m$^2$ | Contrast (%) |
|---|---|
| $10^{-3}$ | 13.8294 |
| $10^{-2}$ | 4.5454 |
| $10^{-1}$ | 1.7461 |
| $10^0$ | 0.8507 |
| $10^1$ | 0.5454 |
| $10^2$ | 0.4360 |
| $10^3$ | 0.4027 |
| $10^4$ | 0.3962 |

As can be seen in FIG. 29, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in M35255 [1], which also pointed out colors on the gamut edge as problematic.

1.4 when Input is 709 Data

Figure 30:
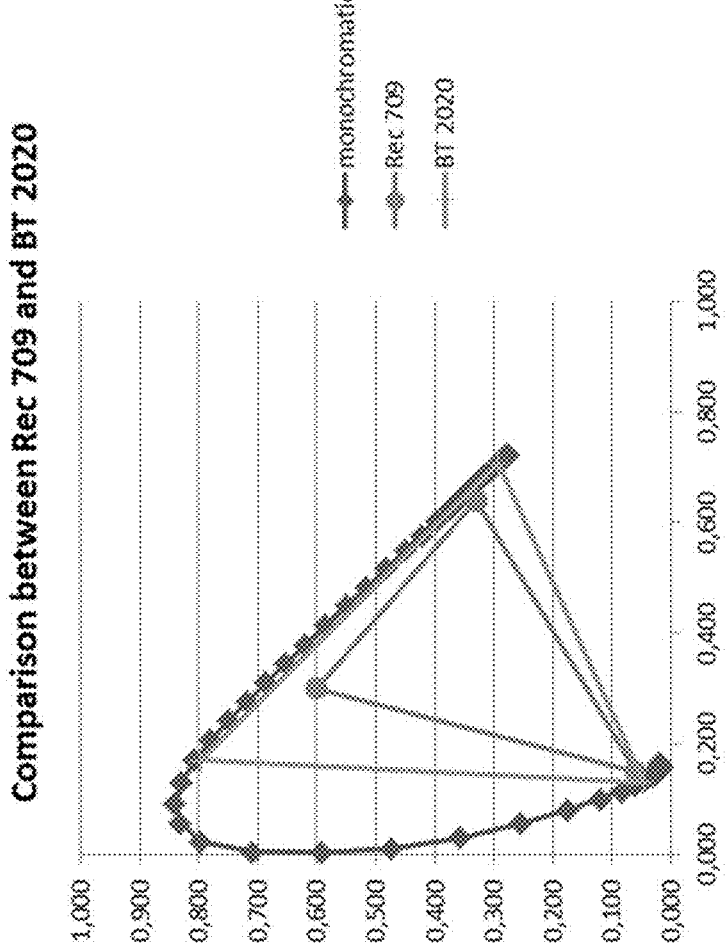
FIG. 30 illustrates a comparison between Rec709 and BT.2020 color gamuts.

The data presented in Table B1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 30. It is therefore reasonable to assume that the relative error will be smaller.

We have run the optimization software to find the Rec709 color that, after conversion to BT.2020, would result in the largest relative error. The resulting two colors are (0, 0, 50) for the left part of the screen and (2, 3, 49) in the right part. This is presented in Table B6.

TABLE B6 data for the "worst" color for 4:2:0 subsampling if input is Rec709 and container format is BT.2020

| pixel 97 | RGB value | Y value | Y diff | relative error | Barten steps |
|---|---|---|---|---|---|
| original Rec709 color | 2 3 49 | | | | |

TABLE B6-continued data for the "worst" color for 4:2:0 subsampling if input is
Rec709 and container format is BT.2020

| pixel 97 | RGB value | Y value | Y diff | relative error | Barten steps |
|---|---|---|---|---|---|
| original BT.2020 color | 4.3650 3.4535 44.1810 | 6.1082 | | | |
| RGB 4:4:4 | 4.3793 3.4293 43.7035 | 6.0672 | 0.0410 | 0.6711% | 1.2305 |
| RGB 4:2:0 | 4.4055 2.9939 63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 30.

1.5 when Input is P3 Data

The same test can be carried out for P3 source data contained in a BT.2020 container. The worst colors are then (2.48, 3.32, 4.63) and (3.29, 0, 6.71), as shown in Table B7.

TABLE B7 data for the "worst" color for 4:2:0 subsampling if
input is P3 and container format is BT.2020

| pixel 97 | RGB value | Y value | Y diff | relative error | Barten steps |
|---|---|---|---|---|---|
| original P3 color | 3.29 0 6.71 | | | | |
| original BT.2020 color | 2.7993 0.2342 6.5960 | 1.2853 | | | |
| RGB 4:4:4 | 2.8099 0.2304 6.4838 | 1.2788 | 0.0065 | 0.5062% | 0.5951 |
| RGB 4:2:0 | 1.4911 0.3834 3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 cd/m$^2$, which equals 0.85%.

1.6 Conclusion

This Annex has investigated the error in luminance due to 4:2:0 subsampling. Although we have not been able to match the worst outlier from M35255 [1], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content
[2] International Organization for Standardization, ISO/IEC JTC1/SC29/WG11, Coding of moving pictures and audio, MPEG2014/N14548, July 2014, Sapporo, Japan, Luthra et al., Test sequences and anchor generation for HDR and Wide Gamut Content Distribution
[3] https://wg11.sc29.org/svn/repos/Explorations/XYZ/HDRTools/branches/0.9-dev
[4] CEA Standard, HDR Static Metadata Extension, CEA-861.3, January 2015

The invention claimed is:

1. A device for processing pixels in a picture of a video sequence comprising multiple pictures, wherein
said device is configured to identify a pixel to be processed in said picture for which a small change or variation in the linear representation of said pixel color results in a comparatively large change or variation in the non-linear representation of said pixel color but the change or variation in the linear representation of said pixel color does not negatively affect visual quality by identifying said pixel for which:
with respect to a general color in an area, a variation in a linear representation of a color of said pixel that is smaller than a first threshold value results in a variation in a non-linear representation of said color that is larger than a second threshold value; and
said variation in said linear representation of said color results in a variation in a luminance and chrominance based representation of said color that is smaller than a third threshold value; and
said device is configured to process said identified pixel by modifying a value of at least one color component of said pixel to reduce variability.

2. The device of claim 1, wherein said device is configured to identify a pixel in said picture having a value of a color component of said linear representation of said color that is smaller than a fourth threshold value and for which a ratio between said value of said color component and a value of another color component of said linear representation of said color is smaller than a fifth threshold value.

3. The device of claim 1, wherein said device is configured to identify a pixel in said picture having a value of a color component of said linear representation of said color that is smaller than a fourth threshold value and for which a value of at least one color component of said linear representation of said color is larger than a sixth threshold value.

4. The device of claim 3, wherein said device is configured to identify a pixel in said picture having said value of said color component of said linear representation of said color that is smaller than said fourth threshold value and for which said value of said at least one other color component of said linear representation of said color is equal to or larger than a factor times said value of said color component of said linear representation of said color, wherein said factor is larger than one.

5. The device of claim 1, wherein said device is configured to identify a pixel to be processed in said picture for which:
   a variation in said linear representation of said color that is smaller than said first threshold value results in a variation in a Y'Cb'Cr' representation of said color that is larger than said second threshold value; and
   said variation in said linear representation of said color results in a variation in a PQ(Y)u'v' or PQ(Y)xy representation of said color that is smaller than said third threshold value.

6. The device of claim 5, wherein
   said linear representation of said color is a RGB representation of said color;
   said device is configured to calculate, for said pixel, an instability coefficient based on the derivative of a luma component Y', a chroma component Cb' and a chroma component Cr' with respect to at least one color component in said RGB representation of said color and the derivative of a luminance based component PQ(Y) and chrominance based components u'v' or xy with respect to said at least one color component in said RGB representation; and
   said device is configured to select said pixel to be processed if said instability coefficient is higher than seventh threshold value.

7. The device of claim 6, wherein said device is configured to calculate said instability coefficient $c_i$ based on:

$$\frac{\left\|w_1 \frac{\partial Y'}{dA}, w_2 \frac{\partial Cb'}{dA}, w_3 \frac{\partial Cr'}{dA}\right\|^2}{\left\|w_4 \frac{\partial PQ(Y)}{dA}, w_5 \frac{\partial u'}{dA}, w_6 \frac{\partial v'}{dA}\right\|^2} = \frac{w_1^2 \frac{\partial Y'^2}{dA} + w_2^2 \frac{\partial Cb'^2}{dA} + w_3^2 \frac{\partial Cr'^2}{dA}}{w_4^2 \frac{\partial PQ(Y)^2}{dA} + w_5^2 \frac{\partial u'^2}{dA} + w_6^2 \frac{\partial v'^2}{dA}}$$

or $$\frac{\left\|w_1 \frac{\partial Y'}{dA}, w_2 \frac{\partial Cb'}{dA}, w_3 \frac{\partial Cr'}{dA}\right\|^2}{\left\|w_4 \frac{\partial PQ(Y)}{dA}, w_5 \frac{\partial x}{dA}, w_6 \frac{\partial y}{dA}\right\|^2} = \frac{w_1^2 \frac{\partial Y'^2}{dA} + w_2^2 \frac{\partial Cb'^2}{dA} + w_3^2 \frac{\partial Cr'^2}{dA}}{w_4^2 \frac{\partial PQ(Y)^2}{dA} + w_5^2 \frac{\partial x^2}{dA} + w_6^2 \frac{\partial y^2}{dA}}$$

wherein $w_1 \ldots w_e$ are non-zero weights or absent and A represents one of a red color component R, a green color component G and a blue color component B in said RGB representation.

8. The device of claim 6, wherein
   said device is configured to replace an original value of at least one color component of said pixel with a modified value of said at least one color component if said instability coefficient is higher than said seventh threshold value;
   said device is configured to replace said original value of said at least one color component with a linear combination of said original value of said at least one color component and said modified value of said at least one color component if said instability coefficient is equal to or smaller than said seventh threshold value but is equal to or larger than an eighth threshold value; and
   said device is configured to keep said original value of said at least one color component if said instability coefficient is smaller than said eighth threshold value.

9. The device of claim 6, wherein said device is configured to filter said value of said at least one color component of said pixel.

10. The device of claim 9, wherein said device is configured to filter said value of said at least one color component of said pixel with a filter having filter coefficients that are determined based on said instability coefficient.

11. The device of claim 1, wherein said device is configured to process said identified pixel by modifying a value of at least one color component of said linear representation of said color.

12. The device of claim 1, wherein said device is configured to replace said value of said at least one color component of said pixel with a weighted average of values of said at least one color component of neighboring pixels in said picture.

13. The device of claim 12, wherein
    said device is configured to identify neighboring pixels in said picture for which:
    a variation in a linear representation of a color of said neighboring pixel that is smaller than said first threshold value results in a variation in a non-linear representation of said color of said neighboring pixel that is larger than said second threshold value; and
    said variation in said linear representation of said color of said neighboring pixel results in a variation in a luminance and chrominance based representation of said color of said neighboring pixels that is smaller than said third threshold value; and
    said device is configured to replace said value of said at least one color component of said pixel with a weighted average of values of said at least one color component of said identified neighboring pixels in said picture.

14. The device of claim 12, wherein
    said device is configured to identify neighboring pixels in said picture for which:
    an absolute difference between a value of a luminance based component of said pixel and a value of a luminance based component of said neighboring pixel is equal to or smaller than a ninth threshold value; and
    a respective absolute difference between respective values of chrominance based components of said pixel and respective values of chrominance based components of said neighboring pixel is equal to or smaller than a tenth threshold value; and
    said device is configured to replace said value of said at least one color component of said pixel with a weighted average of values of said at least one color component of said identified neighboring pixels in said picture.

15. The device of claim 1, wherein said device is configured to set said value of said at least one color component to a fixed value.

16. The device of claim 2, further comprising:
    a processor; and
    a memory comprising instructions executable by said processor, wherein
    said processor is operative to identify said pixel to be processed; and
    said processor is operative to process said identified pixel.

17. A user equipment comprising a device of claim 1, wherein said user equipment is selected from a group consisting of a computer, a laptop, a smart phone, a tablet and a set-top box.

18. A device for encoding a pixel in a picture of a video sequence comprising multiple pictures, said device comprises:

a processor, and a memory comprising instructions executable by said processor, wherein said processor is operative to identify a pixel to be processed in said picture for which a small change or variation in the linear representation of said pixel color results in a comparatively large change or variation in the non-linear representation of said pixel color but the change or variation in the linear representation of said pixel color does not negatively affect visual quality by identifying said pixel for which:

with respect to a general color in an area, a variation in a linear representation of a color of said pixel that is smaller than a first threshold value results in a variation in a non-linear representation of said color that is larger than a second threshold value; and said variation in said linear representation of said color results in a variation in a luminance and chrominance based representation of said color that is smaller than a third threshold value;

said processor is operative to process said identified pixel by modifying a value of at least one color component in said linear representation of said color to reduce variability;

said processor is operative to convert said linear representation of said color into a non-linear representation of said color of said pixel; and said processor is operative to encode said non-linear representation of said color.

19. A computer program product comprising a non-transitory computer readable medium storing a computer program comprising instructions, which when executed by a processor, cause said processor to:

identify a pixel to be processed in a picture of a video sequence comprising multiple pictures for which a small change or variation in the linear representation of said pixel color results in a comparatively large change or variation in the non-linear representation of said pixel color but the change or variation in the linear representation of said pixel color does not negatively affect visual quality by identifying said pixel for which:

with respect to a general color in an area, a variation in a linear representation of a color of said pixel that is smaller than a first threshold value results in a variation in a non-linear representation of said color that is larger than a second threshold value; and said variation in said linear representation of said color results in a variation in a luminance and chrominance based representation of said color that is smaller than a third threshold value; and process said identified pixel by modifying a value of at least one color component of said pixel to reduce variability.

20. The computer program product of claim 19, wherein said computer program further comprises instructions, which when executed by said processor, cause said processor to:

process said identified pixel by modifying a value of at least one color component in said linear representation of said color;

convert said linear representation of said color into a non-linear representation of said color of said pixel; and encode said non-linear representation of said color.

\* \* \* \* \*

UNITED STATES PATENT AND TRADEMARK OFFICE
CERTIFICATE OF CORRECTION

PATENT NO. : 9,918,095 B1
APPLICATION NO. : 15/503301
DATED : March 13, 2018
INVENTOR(S) : Ström et al.

It is certified that error appears in the above-identified patent and that said Letters Patent is hereby corrected as shown below:

In the Specification

In Column 11, Line 53, delete "parameter a" and insert -- parameter $\alpha$ --, therefor.

In Column 12, Line 33, delete "transform unit (PU)" and insert -- transform unit (TU) --, therefor.

In Column 13, Line 7, delete "u'|T10" and insert -- u'|$\leq$T10 --, therefor.

In Column 14, Line 19, delete "Y'Cb'Cr" and insert -- Y'Cb'Cr' --, therefor.

In Column 18, Line 2, delete "100" and insert -- 10C --, therefor.

In Column 19, Line 43, delete "($\delta$v'/dB)$^2$)" and insert -- ($\partial$v'/dB)$^2$) --, therefor.

In Column 20, Line 26, delete "||$\delta$Cb'/dG||" and insert -- ||$\partial$Cb'/dG|| --, therefor.

In Column 20, Line 27, delete "||$\partial$Cr'/G||" and insert -- ||$\partial$Cr'/dG|| --, therefor.

In Column 22, Line 53, delete "abs(u2'-u)<=1" and insert -- abs(u2'-u')<=1 --, therefor.

In Column 23, Lines 2-3, delete "y2)" and insert -- y2)) --, therefor.

In Column 23, Line 16, delete "19A-190" and insert -- 19A-19C --, therefor.

In Column 24, Line 7, delete "abs(u2'-u)" and insert -- abs(u2'-u') --, therefor.

In Column 25, Line 24, delete "$C_i$=(($\partial$Y'dG)$^2$" and insert -- $C_i$=(($\partial$Y'/dG)$^2$ --, therefor.

In Column 32, Line 1, delete "medium 240," and insert -- medium 250, --, therefor.

Signed and Sealed this
Tenth Day of July, 2018

Andrei Iancu
*Director of the United States Patent and Trademark Office*

CERTIFICATE OF CORRECTION (continued)
U.S. Pat. No. 9,918,095 B1

In Column 32, Line 44, delete "encoder 103 and converter 104" and insert -- encoder 123 and converter 124 --, therefor.

In Column 33, Lines 51-52, delete "Operations and Support System (OSS)" and insert -- Operations Support System (OSS) --, therefor.

In Column 34, Line 2, delete "and or" and insert -- and/or --, therefor.

In Column 34, Lines 33-35, delete " $SY = L_p \left( \frac{\max\left[\left(V^{\frac{1}{m}} - c_1\right), 0\right]}{c_2 - c_3 V^{\frac{1}{m}}} \right)^{\frac{1}{n}}$ " and insert -- $Y = L_p \left( \frac{\max\left[\left(V^{1/m} - c_1\right), 0\right]}{c_2 - c_3 V^{1/m}} \right)^{1/n}$ --, therefor.

In Column 35, Line 43, delete "Cr-Cr" and insert -- Cr'-Cr --, therefor.

In Column 39, Line 40, delete "(1/n));" and insert -- (1/n)). --, therefor.

In Column 41, Line 23, delete "$Y\sim(k1+k2k3)$" and insert -- $Y \sim (k1+k2+k3)$ --, therefor.

In Column 42, Line 24, delete "bit)" and insert -- bit)) --, therefor.

In Column 45, Line 21, delete "floor( ) This" and insert -- floor( ). This --, therefor.

In the Claims

In Column 49, Line 48, in Claim 7, delete "$w_e$" and insert -- $w_6$ --, therefor.

In Column 50, Line 54, in Claim 16, delete "claim 2," and insert -- claim 1, --, therefor.

In Column 51, Line 1, in Claim 18, delete "processor," and insert -- processor; --, therefor.